United States Patent
Nagata

(10) Patent No.: US 11,880,625 B2
(45) Date of Patent: Jan. 23, 2024

(54) DISPLAY DEVICE, SCREEN GENERATION METHOD, AND SCREEN GENERATION PROGRAM

(71) Applicant: OMRON Corporation, Kyoto (JP)

(72) Inventor: Yuta Nagata, Kusatsu (JP)

(73) Assignee: OMRON Corporation, Kyoto (JP)

(*) Notice: Subject to any disclaimer, the term of this patent is extended or adjusted under 35 U.S.C. 154(b) by 0 days.

(21) Appl. No.: 16/644,154

(22) PCT Filed: Jan. 28, 2019

(86) PCT No.: PCT/JP2019/002730
§ 371 (c)(1),
(2) Date: Mar. 3, 2020

(87) PCT Pub. No.: WO2019/167512
PCT Pub. Date: Sep. 6, 2019

(65) Prior Publication Data
US 2021/0064318 A1 Mar. 4, 2021

(30) Foreign Application Priority Data
Mar. 1, 2018 (JP) .................................. 2018-036274

(51) Int. Cl.
*G06F 3/048* (2013.01)
*G06F 3/14* (2006.01)
(Continued)

(52) U.S. Cl.
CPC ............ *G06F 3/14* (2013.01); *G05B 19/4155* (2013.01); *G06F 3/0482* (2013.01); *G06F 3/0484* (2013.01); *G05B 2219/31368* (2013.01)

(58) Field of Classification Search
CPC ........ G06F 3/14; G06F 3/0482; G06F 3/0484; G05B 19/4155; G05B 2219/31368
See application file for complete search history.

(56) References Cited

U.S. PATENT DOCUMENTS

| 2013/0070788 A1* | 3/2013 | Deiretsbacher | H04L 67/12 370/466 |
| 2013/0135331 A1* | 5/2013 | Koara | G05B 19/0428 345/581 |

(Continued)

FOREIGN PATENT DOCUMENTS

DE 102016201077 A1 7/2017
JP 2003-67176 A 3/2003
(Continued)

OTHER PUBLICATIONS

An English translation of the International Search Report("ISR") of PCT/JP2019/002730 dated Mar. 12, 2019.
(Continued)

*Primary Examiner* — Mahelet Shiberou
(74) *Attorney, Agent, or Firm* — METROLEX IP LAW GROUP, PLLC

(57) ABSTRACT

To provide a technique of being capable of reducing design man-hours of a screen visually representing a state of a drive device than before. A display device receives an information model representing a state of drive device and defining a plurality of variables defined in a predetermined standard, and a display rule relating to screen. In display rule, a kind of a display object visually representing a value of the variable and a display definition relating to display of the display object are associated with each other with respect to a part or all of the plurality of variables. Display device acquires the display object and display definition corresponding to each variable of a display target included in information model from display rule, and disposes each of the display objects on screen according to the corresponding display definition.

13 Claims, 22 Drawing Sheets

(51) Int. Cl.
*G05B 19/4155* (2006.01)
*G06F 3/0482* (2013.01)
*G06F 3/0484* (2022.01)

(56) References Cited

U.S. PATENT DOCUMENTS

| | | | | |
|---|---|---|---|---|
| 2013/0346842 A1* | 12/2013 | Koara | ............ | G06F 3/0481 |
| | | | | 715/211 |
| 2015/0029195 A1* | 1/2015 | Ito | ............ | G06F 3/1462 |
| | | | | 345/441 |
| 2018/0113573 A1* | 4/2018 | Kulus | ............ | G06F 3/0482 |
| 2018/0173205 A1* | 6/2018 | Miller | ............ | G05B 19/042 |
| 2018/0225077 A1 | 8/2018 | Hanaki | | |
| 2018/0275858 A1 | 9/2018 | Zhou et al. | | |
| 2018/0300437 A1* | 10/2018 | Thomsen | ............ | G06F 16/24573 |
| 2019/0041831 A1 | 2/2019 | Albers et al. | | |

FOREIGN PATENT DOCUMENTS

| | | |
|---|---|---|
| JP | 2004-199528 A | 7/2004 |
| JP | 2009-43135 A | 2/2009 |
| JP | 2011-81430 A | 4/2011 |
| JP | 2012-018541 A | 1/2012 |
| JP | 2017-062635 A | 3/2017 |
| JP | 2017-187984 A | 10/2017 |
| JP | 6261816 B2 | 1/2018 |
| WO | 2017072928 A1 | 5/2017 |

OTHER PUBLICATIONS

The Written Opinion("WO") of PCT/JP2019/002730 dated Mar. 12, 2019.
The extended European search report (EESR) dated Oct. 18, 2021 in a counterpart European patent application.
The Office Action (CNOA) dated Aug. 30, 2022 in a counterpart Chinese patent application, with English machine translation.

* cited by examiner

| MEMBER NAME | DESCRIPTION |
|---|---|
| ID | ID VALUE OF USER DEFINITION |
| Name | NAME OF USER DEFINITION |
| Unit | PARAMETER UNIT |
| Value | PARAMETER VALUE |

FIG. 10

| DISPLAY OBJECT NAME | KIND OF DISPLAY OBJECT | CORRESPONDING VARIABLE | VARIABLE VALUE |
|---|---|---|---|
| PRESSURE GAGE | TACHOMETER | PROCESS VARIABLE (STRUCTURE) | MachineA_Pressure1<br>.ID= 100<br>.Name= DEVICE A PRESSURE VALVE 1<br>.Unit=K<br>.Value = 0 |
| THERMOMETER | THERMOMETER | PROCESS VARIABLE (STRUCTURE) | MachineA_Thermo1<br>.ID= 1500<br>.Name= DEVICE A TEMPERATURE 1<br>.Unit=°C<br>.Value = 0 |
| STATUS | STATE TRANSITION DIAGRAM | PackML_Status VARIABLE (STRUCTURE) | Status<br>.StateCurrent=2<br>.UintModeCurrent=1 |
| STATUS | STATUS LAMP<br>Current State: Stopped<br>Current Unit Mode: Production Mode | PackML_Status VARIABLE (STRUCTURE) | Status<br>.StateCurrent=2<br>.UintModeCurrent=1 |

| DISPLAY OBJECT NAME | KIND OF DISPLAY OBJECT | DISPLAY DEFINITION |
|---|---|---|
| PRESSURE GAGE | TACHOMETER<br/>ID:100<br/>Name:DEVICE A VALVE PRESSURE 1 | `<Gauge Name="Gauge" Canvas.Left="0" Canvas.Top="0" Width="80" Height="100" />`<br/>`<Label Name="Label_ID" Text="ID:" Variable=".ID" FontSize="12" Canvas.Left="140" Canvas.Top="20" />`<br/>`<Label Name="Label_Name" Text="Name:" Variable=".Name" FontSize="12" Canvas.Left="140" Canvas.Top="60" />` |
| THERMOMETER | THERMOMETER<br/>ID:1500<br/>Name:DEVICE A TEMPERATURE 1<br/>0 20 40 60 80 100 | `<Label Name="Label_ID" Text="ID:" Variable=".ID" Canvas.Left="0" Canvas.Top="0" />`<br/>`<Label Name="Label_Name" Text="Name:" Variable=".Name" FontSize="12" Canvas.Left="0" Canvas.Top="30" />`<br/>`<LinearGauge Name="" Canvas.Left="0" Canvas.Top="60" Width="200" Height="50" Variable=".Value" />` |
| STATUS 1 | STATE TRANSITION DIAGRAM<br/> | `<Image Name="StateMachine" Canvas.Left="0" Canvas.Top="0" Width="300" Height="200">`<br/>`<Behavior Expression=".StateCurrent">`<br/>`<PropertySet Condition="1" Name="Path" Value="./img1.jpeg" />`<br/>`<PropertySet Condition="2" Name="Path" Value="./img2.jpeg" />`<br/>... OMISSION<br/>`<PropertySet Condition="9" Name="Path" Value="./img9.jpeg" />`<br/>`</Behavior>`<br/>`</Image>` |

412B(412)

DISPLAY DEVICE, SCREEN GENERATION METHOD, AND SCREEN GENERATION PROGRAM

TECHNICAL FIELD

The present disclosure relates to a technique of automatically generating a screen that visually represents a state of a drive device.

BACKGROUND ART

A factory automation (FA) system that automates a production process becomes widespread in various production sites. The FA system is formed of various industrial drive devices. For example, the industrial drive devices include a moving table that moves a workpiece, a conveyor that conveys the workpiece, and an arm robot that moves the workpiece to a predetermined destination. These drive devices are controlled by an industrial control device (hereinafter, also referred to as a "controller") such as a programmable logic controller (PLC) and a robot controller.

In order to monitor the status of the drive device, it is necessary to access a variable in the controller. Regarding a technique of accessing the variable in the controller, Japanese Patent Laying-Open No. 2012-018541 (PTL 1) discloses a display device "that can easily collect data of an external device regardless of a kind or connection of the external device".

CITATION LIST

Patent Literature

PTL 1: Japanese Patent Laying-Open No. 2012-018541

SUMMARY OF INVENTION

Technical Problem

In order to intuitively grasp the state of the drive device, there is a display device that displays a screen (hereinafter, also referred to as a "display device screen") that visually represents the state of the drive device. The display device generates the display device screen according to a screen generation program designed by a designer.

More specifically, the designer associates the variable in the controller with each display object that is a component of the display device screen, and defines display of the display object associated with the variable on the screen generation program. Thereafter, the designer compiles the designed screen generation program, and downloads an execution file of the screen generation program to the display device. The display device generates and displays the display device screen based on acceptance of an instruction to execute the execution file. Thereafter, when receiving a value of the variable from the controller, the display device changes the display of the corresponding display object according to the value of the variable. A user can intuitively grasp the state of the drive device by checking the display of the display object.

In this way, the designer needs to previously perform programming according to a device configuration of the FA system. In order to reduce such time and effort of screen design, there is a demand for a technique that can more easily generate the display device screen.

The present disclosure has been made in order to solve the above problem, and an object of the present disclosure in one aspect is to provide a technique of being capable of reducing design man-hours of the screen that visually represents the state of the drive device than before.

Solution to Problem

According to one aspect of the present disclosure, a display device includes: a display unit configured to display a screen representing a state of a drive device controlled by a controller; and a communicator configured to receive an information model defining a plurality of variables, each variable representing the state of the drive device and being defined in a predetermined standard, from the controller. The communicator further receives a display rule relating to the screen from the controller or an external device. In the display rule, a kind of a display object visually representing a value of the variable and a display definition relating to display of the display object are associated with each other with respect to a part or all of the plurality of variables defined in the predetermined standard. The display device further includes a control device configured to generate the screen. The control device acquires the display object and display definition corresponding to each variable of a display target in the plurality of variables included in the information model from the display rule, and disposes each of the display objects on the screen according to the corresponding display definition.

With this disclosure, using the information model conforming to the predetermined standard, a designer does not worry about a format (for example, a variable name or a variable type) of the variable exchanged between the controller and the drive device when designing the screen. As a result, the designer can determine the specification of the screen only by defining the display object associated with each variable and the display definition of each display object. Consequently, the design man-hours of the screen are reduced than before.

In an example of the present disclosure, the display unit is configured to accept an operation to select the variable of the display target from the plurality of variables included in the information model.

With this disclosure, a user can select any variable of the display target. Additionally, the user can appropriately change the screen according to the variable to be monitored.

In an example of the present disclosure, the control device updates display of the corresponding display object according to a value of the variable successively received from the controller.

With this disclosure, the user can intuitively grasp the value of the variable representing the state of the drive device.

In an example of the present disclosure, the display device further includes a storage device configured to store the generated screen as a screen history. Based on selection of one screen history from the screen histories stored in the storage device, the control device displays the screen indicated by the one screen history on the display unit again.

With this disclosure, the user can call any screen generated by himself/herself or another person in any timing.

In an example of the present disclosure, the display definition includes at least one of a display position of the display object displayed on the screen and a display size of the display object.

With this disclosure, the display position and the display size of the display object on the screen are fixed.

In an example of the present disclosure, the predetermined standard includes object linking and embedding for process control unified architecture (OPC-UA).

With this disclosure, using a communication protocol conforming to the OPC-UA, the data exchange between the display device and the controller can be performed without depending on the OS or the vendor.

According to another aspect of the present disclosure, a screen generation method relating to a screen representing a state of a drive device controlled by a controller, the screen generation method includes: receiving an information model defining a plurality of variables, each variable representing the state of the drive device and being defined in a predetermined standard, from the controller; and receiving a display rule relating to the screen from the controller or an external device. In the display rule, a kind of a display object visually representing a value of the variable and a display definition relating to display of the display object are associated with each other with respect to a part or all of the plurality of variables defined in the predetermined standard. The screen generation method further includes acquiring the display object and display definition corresponding to each variable of a display target in the plurality of variables included in the information model from the display rule to dispose each of the display objects on the screen according to the corresponding display definition.

With this disclosure, using the information model conforming to the predetermined standard, a designer does not worry about a format (for example, a variable name or a variable type) of the variable exchanged between the controller and the drive device when designing the screen. As a result, the designer can determine the specification of the screen only by defining the display object associated with each variable and the display definition of each display object. Consequently, the design man-hours of the screen are reduced than before.

According to still another aspect of the present disclosure, a screen generation program relating to a screen representing a state of a drive device controlled by a controller, the screen generation program causes a computer to perform: receiving an information model defining a plurality of variables, each variable representing the state of the drive device and being defined in a predetermined standard, from the controller; and receiving a display rule relating to the screen from the controller or an external device. In the display rule, a kind of a display object visually representing a value of the variable and a display definition relating to display of the display object are associated with each other with respect to a part or all of the plurality of variables defined in the predetermined standard. The screen generation program further includes acquiring the display object and display definition corresponding to each variable of a display target in the plurality of variables included in the information model from the display rule to dispose each of the display objects on the screen according to the corresponding display definition.

With this disclosure, using the information model conforming to the predetermined standard, a designer does not worry about a format (for example, a variable name or a variable type) of the variable exchanged between the controller and the drive device when designing the screen. As a result, the designer can determine the specification of the screen only by defining the display object associated with each variable and the display definition of each display object. Consequently, the design man-hours of the screen are reduced than before.

Advantageous Effects of Invention

In one aspect, the design man-hours of the screen that visually represents the state of the drive device can be reduced than before.

BRIEF DESCRIPTION OF DRAWINGS

FIG. 9 is a view illustrating one data structure of a process variable.

FIG. 10 is a view illustrating an example of object information.

FIG. 11 is a view illustrating an example of template information.

DESCRIPTION OF EMBODIMENT

Hereinafter, an embodiment of the present invention will be described with reference to the drawings. In the following description, the same parts and components are denoted by

A. Application Example

Figure 1:
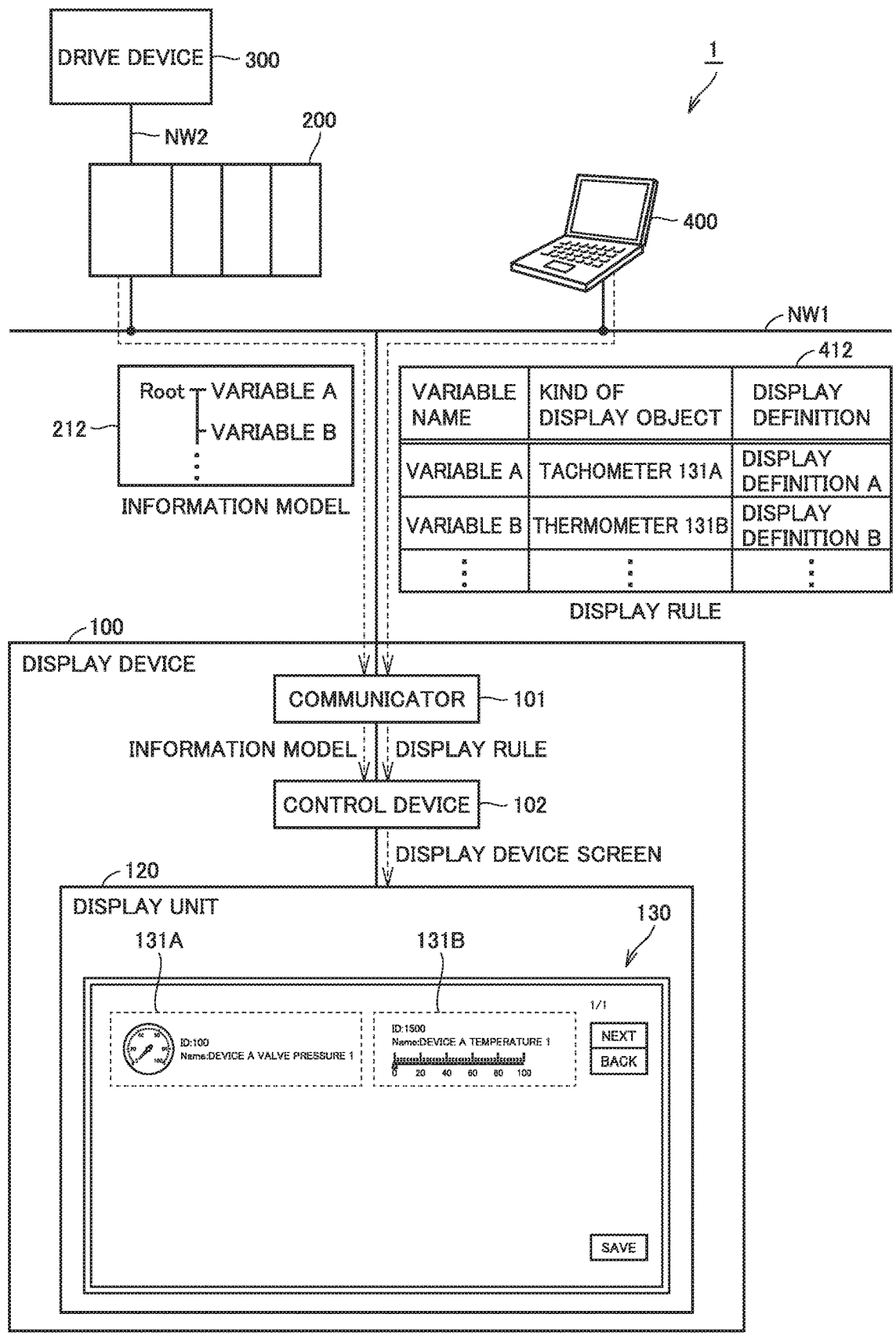
FIG. 1 is a view illustrating a configuration example of an FA system according to an embodiment.

With reference to FIG. 1, an application example of the present invention will be described. FIG. 1 is a view illustrating a configuration example of an FA system 1.

FA system 1 is a system that automates a production process. In the example of FIG. 1, FA system 1 includes at least one display device 100, at least one controller 200, at least one drive device 300, and at least one support device 400.

Display device 100, controller 200, and support device 400 are connected to a network NW1. For example, desirably a network conforming to a predetermined standard that can perform data exchange without depending on a vendor or a kind of an operating system (OS) is used as network NW1. The predetermined standard may be a standard specification or a standard or a specification unique to the vendor. For example, OPC-UA is known as the standard specification. The OPC-UA is a communication standard specification defined to perform the data exchange without depending on the vendor or the kind of the OS. Display device 100 can easily access data (variable) managed in controller 200 using controller 200 corresponding to the OPC-UA.

The following description has been made on the assumption that the OPC-UA is used. However, the adopted standard is not limited to the OPC-UA, and any standard specification or a vendor-specific standard or specification, which can perform the data exchange without depending on the vendors, the kind of the OS, and the like, can be adopted.

Controller 200 and drive device 300 are connected to a network NW2. Preferably a field network that performs fixed-period communication guaranteeing a data arrival time is used as network NW2. EtherCAT (registered trademark), EtherNet/IP (registered trademark), CompoNet (registered trademark), and the like are known as the field network that performs the fixed-period communication.

Drive device 300 includes various industrial devices that automate the production process. As an example, drive device 300 includes a robot controller that controls an arm robot, a servo driver that controls a servomotor, a visual sensor that photographs a workpiece, and other devices used in the production process.

For example, display device 100 is a human machine interface (HMI), a personal computer (PC), a server, a smartphone, a tablet terminal, or other information processing devices having a display function. Display device 100 includes a communicator 101, a control device 102, and a display unit 120 as a hardware configuration.

Communicator 101 is a communication interface that makes a connection to network NW1. Communicator 101 receives an information model 212 defining a plurality of variables defined by the standard specification from controller 200. As used herein, the "variable" means data representing the state of drive device 300. Stated differently, the "variable" means data in which a value changes in conjunction with the state of each configuration of corresponding drive device 300. Typically, the "variable" is data used in a control program for controller 200 that controls drive device 300, and includes not only data representing one value, but also data represented as an array or data represented as a structure.

There is a standard specification in which the specification (for example, a variable name or a variable type) is defined for the "variable". An example of the standard specification is PackML. A function (for example, Command, Status, and Admin) defined in PackML is expressed according to the information model of the OPC-UA. PackML is defined in the international society of automation (ISA)-88, and is a standard specification that is defined while specialized for a packaging machine. The conformity to the standard specification eliminates necessity of determining the specification for data exchanged between devices.

Communicator 101 receives information model 212 from controller 200, and receives a display rule 412 relating to the screen of display device 100 from support device 400. For example, support device 400 is a PC or a tablet terminal. A control program development tool for controller 200 can be installed in support device 400. A designer can design the control program for controller 200 on the development tool, and install the designed control program in controller 200. The designer can also design the screen displayed on display device 100 on the development tool. For example, the development tool is "Sysmac Studio" (product of OMRON Corporation).

In display rule 412, a kind of a display object visually representing a value of the variable and a display definition relating to display of the display object are associated with each other with respect to a part or all of the plurality of variables defined in the standard specification such as PackML. The "display object" represents one of components (images) that can constitute the screen of display device 100. The "display definition" represents a definition related to a disposition on the screen, such as a display position and a display size of the associated display object. In the example of FIG. 1, a display object "tachometer 131A" and a display definition "display definition A" are associated with "variable A". A display object "thermometer 131B" and a display definition "display definition B" are associated with "variable B".

Control device 102 generates a display device screen 130 based on information model 212 received from controller 200 and display rule 412 received from support device 400. More specifically, control device 102 obtains the display object and the display definition corresponding to each variable of a display target in the plurality of variables included in information model 212 from display rule 412, and disposes each of the display objects on display device screen 130 according to the corresponding display definition. In the example of FIG. 1, display device 100 disposes "tachometer 131A" on display device screen 130 according to associated "display definition A" with respect to "variable A" included in information model 212. Display device 100 also disposes "thermometer 131B" on display device screen 130 according to associated "display definition B" with respect to "variable B" included in information model 212. A user can visually check the values of "variable A" and "variable B" by checking tachometer 131A and thermometer 131B.

As described above, using information model 212 conforming to the standard specification, the designer needs not to worry about a format (for example, a variable name and a variable type) of the variable exchanged between controller 200 and drive device 300 when designing display device screen 130. As a result, the designer can determine the specification of display device screen 130 only by defining the display object associated with each variable and the display definition of the display object. This eliminates the necessity of designing display device screen 130. This also eliminates the necessity of previously preparing (downloading) a program generating the screen on display device 100, and various effects such as cost reduction, improvement of convenience, and improvement of operability are generated. Ultimately, the user can immediately use display device 100 simply by taking purchased display device 100 to the site.

When contents of display rule 412 are edited to redistribute display rule 412 to display device 100, display device screen 130 is regenerated to easily change the screen design.

In the example of FIG. 1, display rule 412 is distributed from support device 400. Alternatively, display rule 412 may be distributed from another external device. As used herein, the "external device" means a device different from the device responsible for automatic generation of display device screen 130. That is, in the example of FIG. 1, the external device means controller 200, support device 400, a server (not illustrated), and the like. As described later, when the function of automatically generating display device screen 130 is mounted on support device 400, the external device means display device 100, controller 200, the server (not illustrated), and the like.

In the example of FIG. 1, the kind of the display object and the display definition are associated with each variable in display rule 412. Alternatively, the kind of the display object and the display definition may be defined as different data. That is, display device 100 may be configured to individually receive the display rule in which the kind of the display object is associated with each variable and the display rule in which the display definition is associated with each variable.

<B. Sequence Flow>

Figure 2:
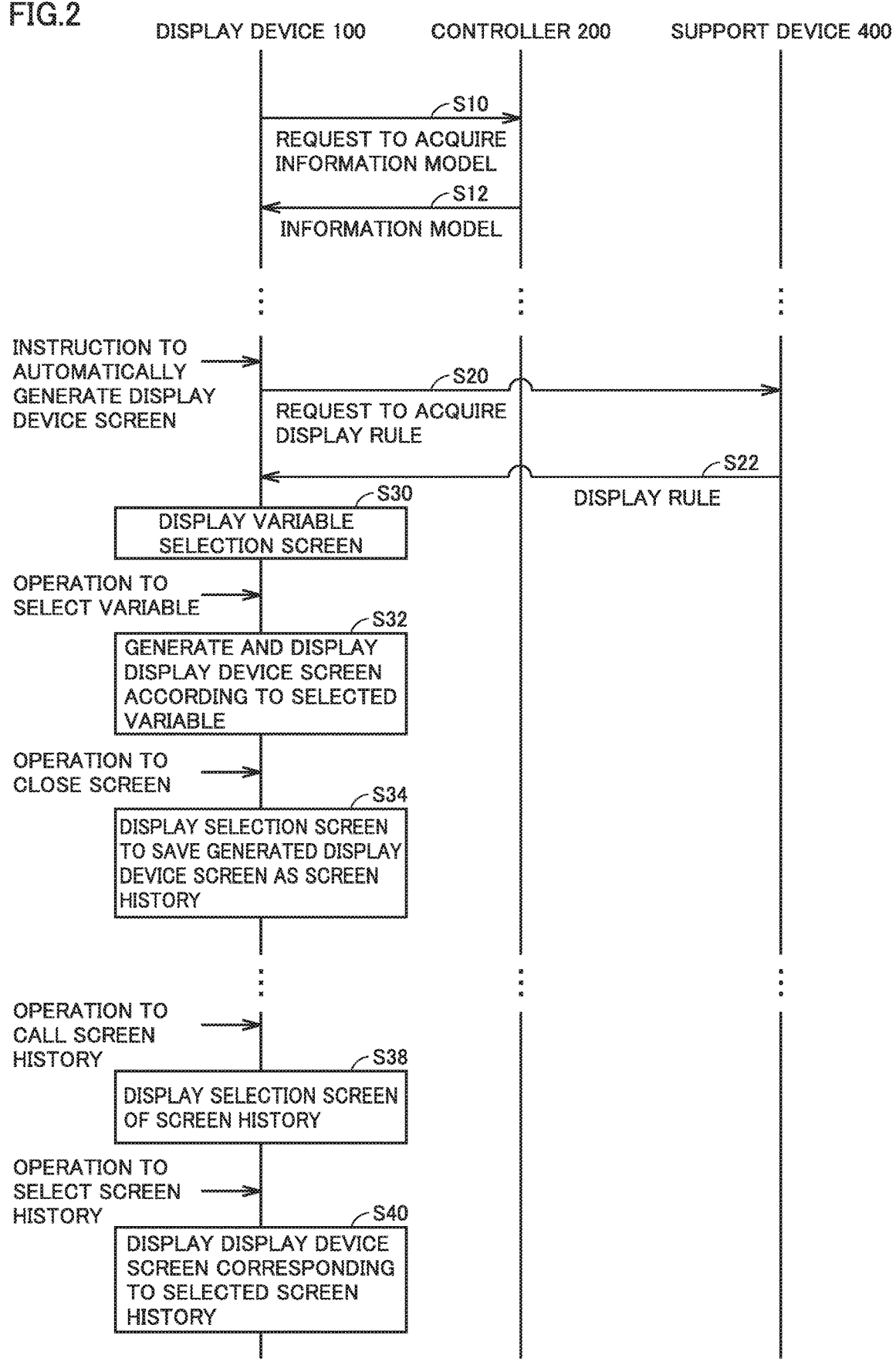
FIG. 2 is a sequence diagram illustrating a data flow among a display device, a controller, and a support device.

With reference to FIGS. 2 to 5, a processing flow relating to the processing of generating display device screen 130 will be described. FIG. 2 is a sequence diagram illustrating a data flow among display device 100, controller 200, and support device 400.

In step S10, display device 100 transmits a request to acquire information model 212 conforming to the standard specification to controller 200. Details of information model 212 will be described later.

In step S12, controller 200 transmits information model 212 to display device 100 based on the reception of the request to acquire information model 212 from display device 100. In information model 212, the variable representing the state of drive device 300 that is a control target of controller 200 is defined.

In step S20, display device 100 transmits a request to acquire display rule 412 to controller 200 based on acceptance of an operation to generate display device screen 130.

In step S22, support device 400 transmits display rule 412 to display device 100 based on the reception of the request to acquire display rule 412 from display device 100. In display rule 412, the kind of the display object visually representing the value of the variable and the display definition relating to the display of the display object are associated with each other with respect to a part or all of the plurality of variables defined in the standard specification. Details of display rule 412 will be described later.

Figure 3:
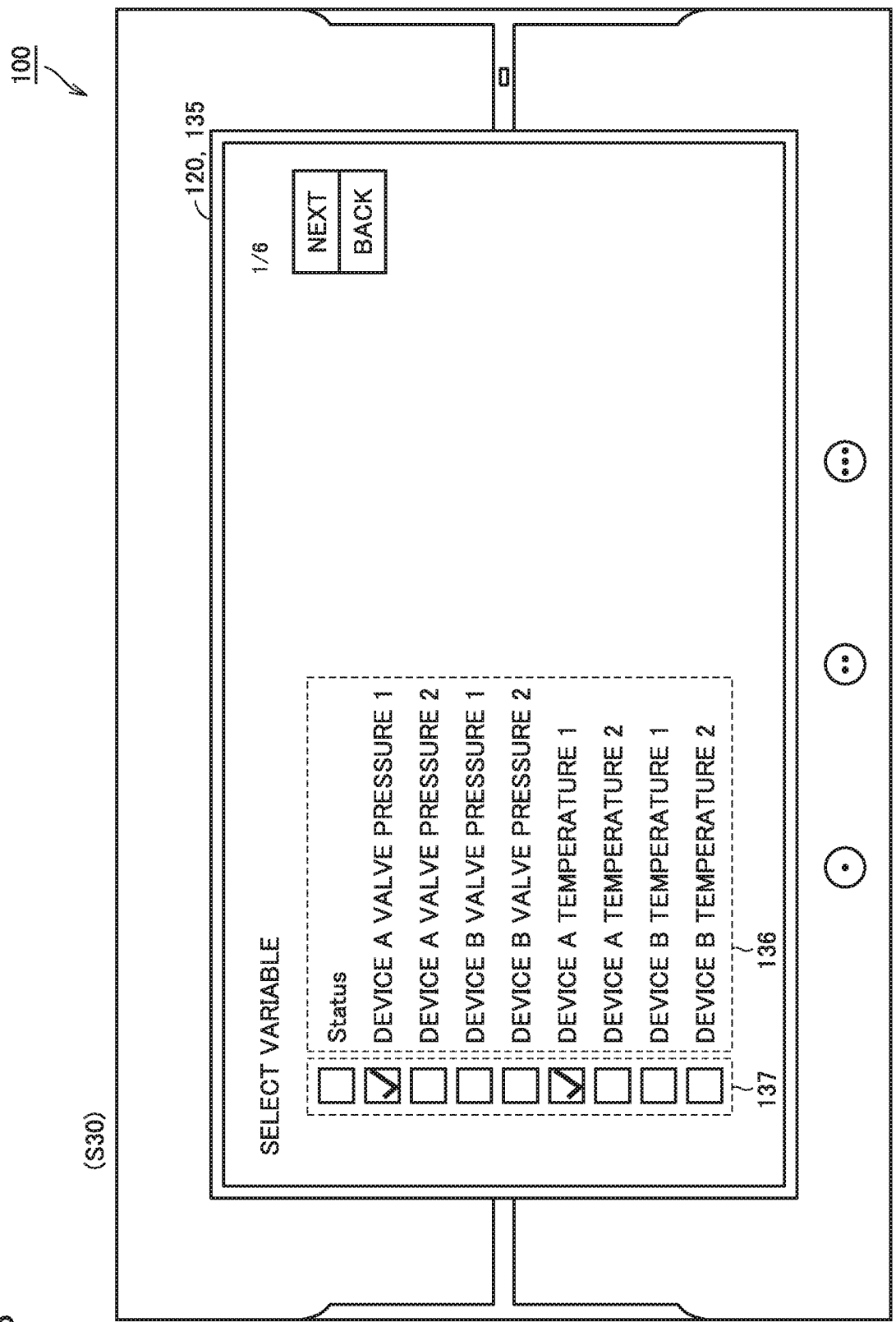
FIG. 3 is a view illustrating an example of a selection screen displayed in step S30 of FIG. 2.

In step S30, display device 100 displays a selection screen accepting selection of the variable of the display target. FIG. 3 is a view illustrating an example of the selection screen displayed in step S30.

FIG. 3 illustrates a selection screen 135 as an example of the selection screen of the variable. Selection screen 135 is displayed on display unit 120 of display device 100. Selection screen 135 is configured to accept an operation to select the variable to be displayed on display device screen 130 from the plurality of variables included in information model 212. More specifically, selection screen 135 includes a variable name display region 136 where the variable name included in information model 212 is displayed and a selection operation acceptance region 137 where the operation to select each variable is accepted.

A list of variable names defined in information model 212 is displayed in variable name display region 136. The variable name displayed in variable name display region 136 may be any information that can uniquely specify each variable. As an example, the variable name displayed in variable name display region 136 may be displayed as the variable name defined on the control program of drive device 300 by controller 200, or displayed as another name associated with each variable.

A check box is displayed in selection operation acceptance region 137 so as to correspond to each variable. When the variable is selected, a check mark is displayed in the corresponding check box. When the variable is not selected, the check mark is not displayed in the corresponding check box. The display or the non-display of the check mark is alternately switched each time the check box is selected.

With reference to FIG. 2 again, in step S32, display device 100 generates display device screen 130 (see FIG. 1) according to the variable selected on variable selection screen 135. More specifically, display device 100 refers to display rule 412 received in step S22, and acquires the display object associated with each variable of the selection target and the display definition. Display device 100 disposes the acquired display object on display device screen 130 according to the corresponding display definition. Thereafter, display device 100 displays generated display device screen 130 on display unit 120.

As described above, display device 100 automatically generates display device screen 130 according to any variable selected in step S30. Consequently, the user can appropriately change display device screen 130 according to the variable that the user wants to monitor without modifying a generation program of display device screen 130.

Figure 4:
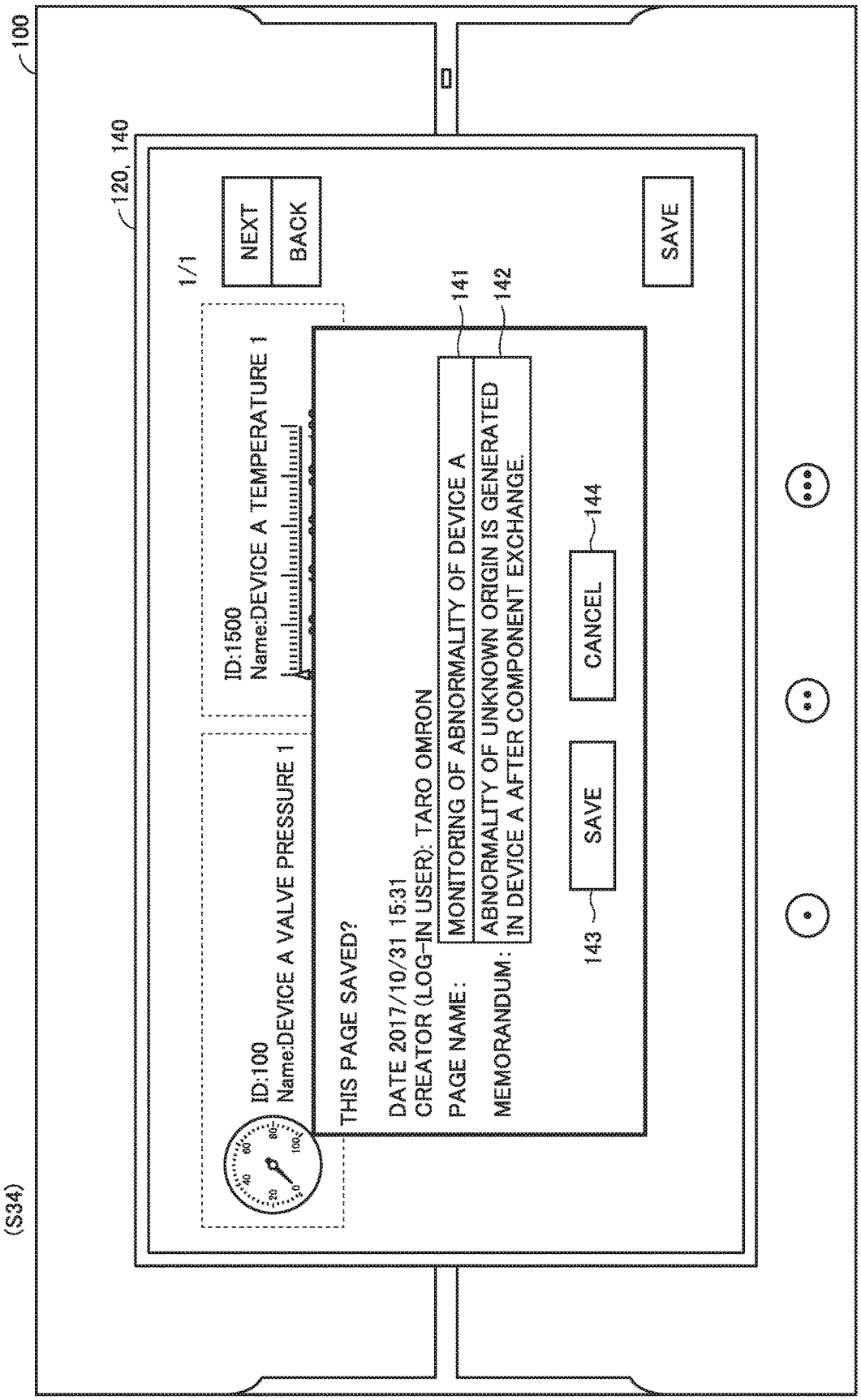
FIG. 4 is a view illustrating an example of the selection screen displayed in step S34 of FIG. 2.

In step S34, display device 100 displays the selection screen selecting whether to save display device screen 130 based on whether an operation to close display device screen 130 generated in step S32 is accepted. FIG. 4 is a view illustrating an example of the selection screen displayed in step S34.

FIG. 4 illustrates a selection screen 140 as an example of the selection screen of save and non-save. Selection screen 140 is displayed on display unit 120 of display device 100. Selection screen 140 includes a creation date of display device screen 130, a creator of display device screen 130, an input region 141 for a screen name attached to display device screen 130, an input region 142 for a memorandum left about display device screen 130, a save button 143, and a cancel button 144.

Based on depression of save button 143, display device 100 saves display device screen 130 generated in step S32 as a screen history. The screen history includes information (such as the selected variable and the display rule associated with each variable) used to generate display device screen 130, the creation date of display device screen 130, the creator of display device screen 130, the screen name input to input region 141, the memorandum input to input region 142, and the like. For example, the screen history is stored in a storage device 110 (see FIG. 16) of display device 100.

Based on depression of cancel button 144, display device 100 closes selection screen 140 without saving display device screen 130 generated in step S32.

Figure 5:
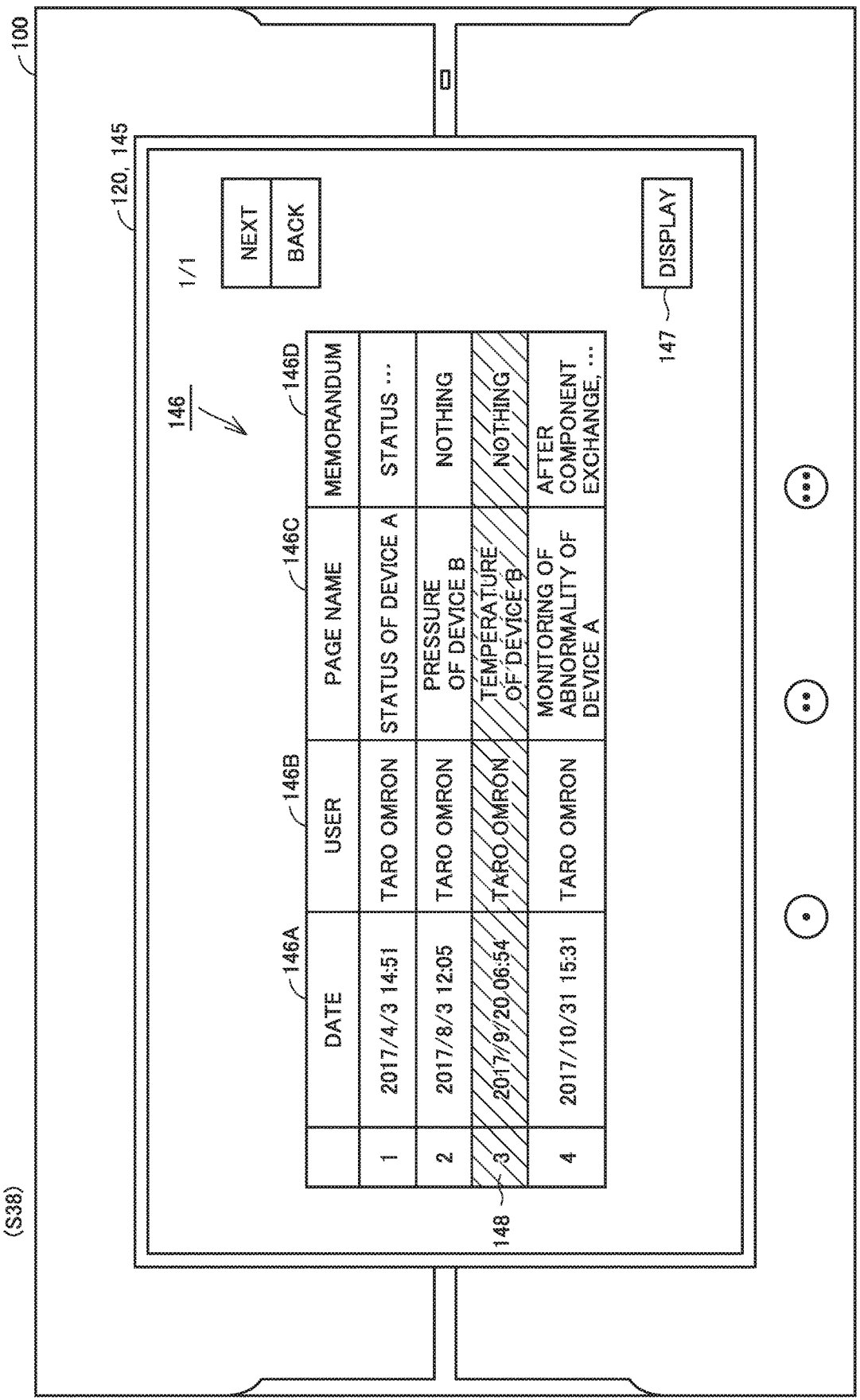
FIG. 5 is a view illustrating an example of the selection screen displayed in step S38 of FIG. 2.

With reference to FIG. 2 again, in step S38, display device 100 displays the selection screen of the screen history based on the acceptance of an operation to display the screen history. FIG. 5 is a view illustrating an example of the selection screen displayed in step S38.

FIG. 5 illustrates a selection screen 145 as an example of the selection screen of the screen history. Selection screen 145 is displayed on display unit 120 of display device 100. Selection screen 145 includes a screen history 146 and a display button 147.

A creation date 146A of display device screen 130, a creator 146B of display device screen 130, a screen name 146C attached to display device screen 130, and a memorandum 146D left about display device screen 130 are listed in screen history 146. The user can arbitrarily select each line displayed in screen history 146. The selected line is displayed in a manner different from other lines. In the example of FIG. 5, a line 148 is selected.

In step S40, display device 100 displays display device screen 130 corresponding to the selected line on display unit 120 based on the depression of display button 147 in a state in which one line of screen history 146 is selected. As described above, based on the selection of one screen history from the screen histories stored in storage device 110 (see FIG. 16), display device 100 displays the screen indicated by the screen history on display unit 120 again. Consequently, the user can call any screen generated by the user or another person in any timing.

<C. Information Model 212>

With reference to FIGS. 6 to 9, information model 212 (see FIG. 1) will be described. In information model 212, the specification of each variable representing the state of drive device 300 is determined according to the standard specification. An example of the standard specification is PackML standardized in conformity to the OPC-UA. Information model 212 is defined in conformity to an address space defined by the OPC-UA.

Figure 6:
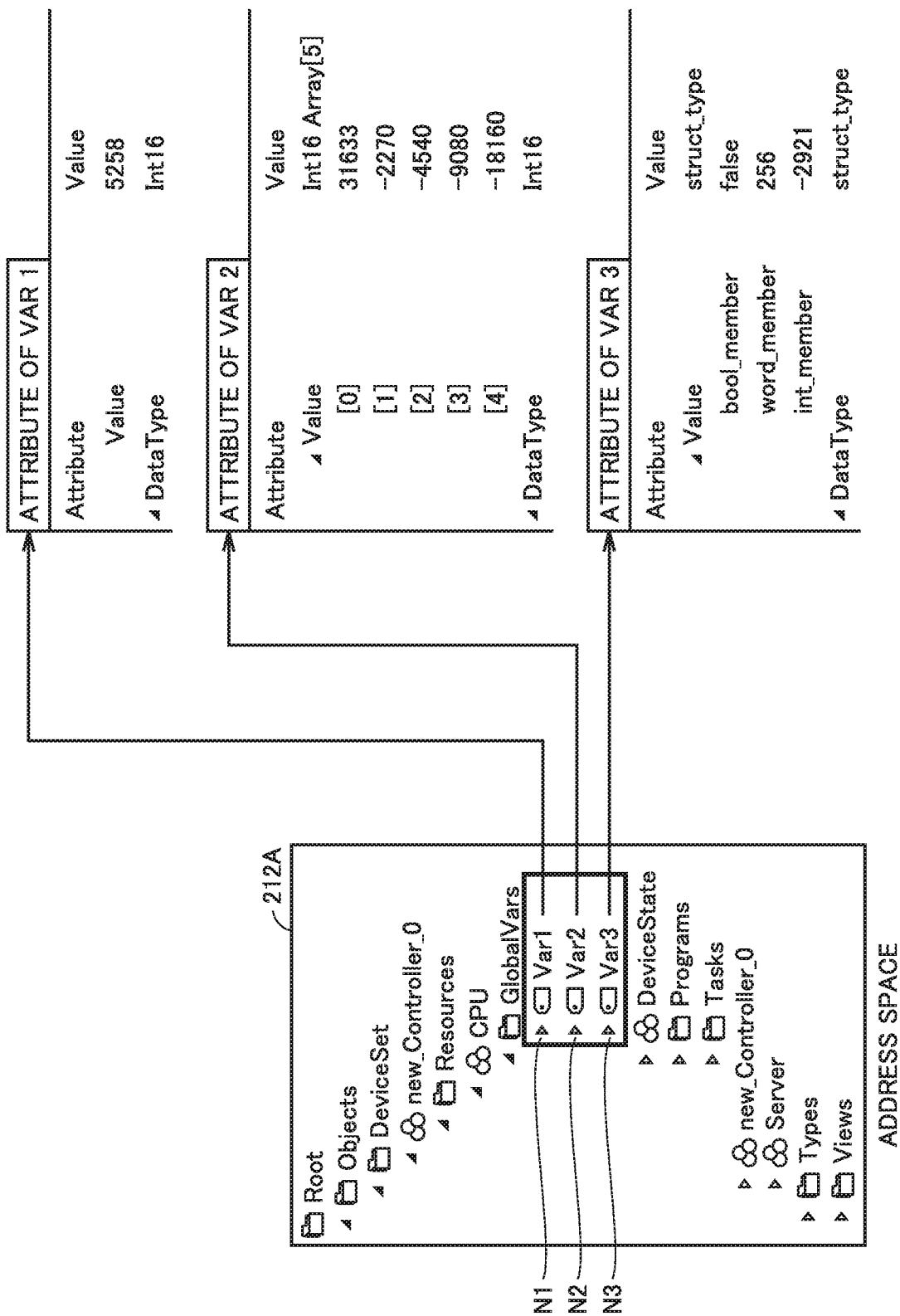
FIG. 6 is a view illustrating an example of an address space defined by object linking and embedding for process control unified architecture (OPC-UA).

The address space of the OPC-UA will be described for the purpose of understanding of PackML. FIG. 6 is a view illustrating an example of the address space defined by the OPC-UA. FIG. 6 illustrates an address space 212A as an example of the address space defined by the OPC-UA.

A logical address of each variable representing the state of drive device 300 is defined in address space 212A. The logical address means a logical position on storage device 110 (see FIG. 16) of display device 100, and represents a relative position based on predetermined information (for example, "Root" in FIG. 6) on storage device 110.

More specifically, address space 212A is formed of a plurality of nodes. Each node defines an attribute (such as an address, a variable value, and a variable type) of the corresponding variable. Each node is associated with another node, and has a hierarchical relationship. Display device 100 can search for a target node by tracing the logical address of each node defined in address space 212A, and refer to the attribute of the traced target node to acquire the type or value of the variable defined in the node.

In FIG. 6, the variable in a controller "new_Controller_0" is managed as nodes N1 to N3. Display device 100 can access nodes N1 to N3 included in an object "GlobalVars" by sequentially tracing a node "new_Controller_0" included in an object "DeviceSet" and a node "CPU" included in an object "Resources".

In the example of FIG. 6, the value and type of the variable are defined as the attributes of the variable in nodes N1 to N3. Display device 100 can specify the type and value of a variable "Var1" associated with node N1 by referring to node N1. Display device 100 can specify the type and value of a variable "Var2" associated with node N2 by referring to node N2. Display device 100 can specify the type and value of a variable "Var3" associated with node N3 by referring to node N3.

Figure 7:
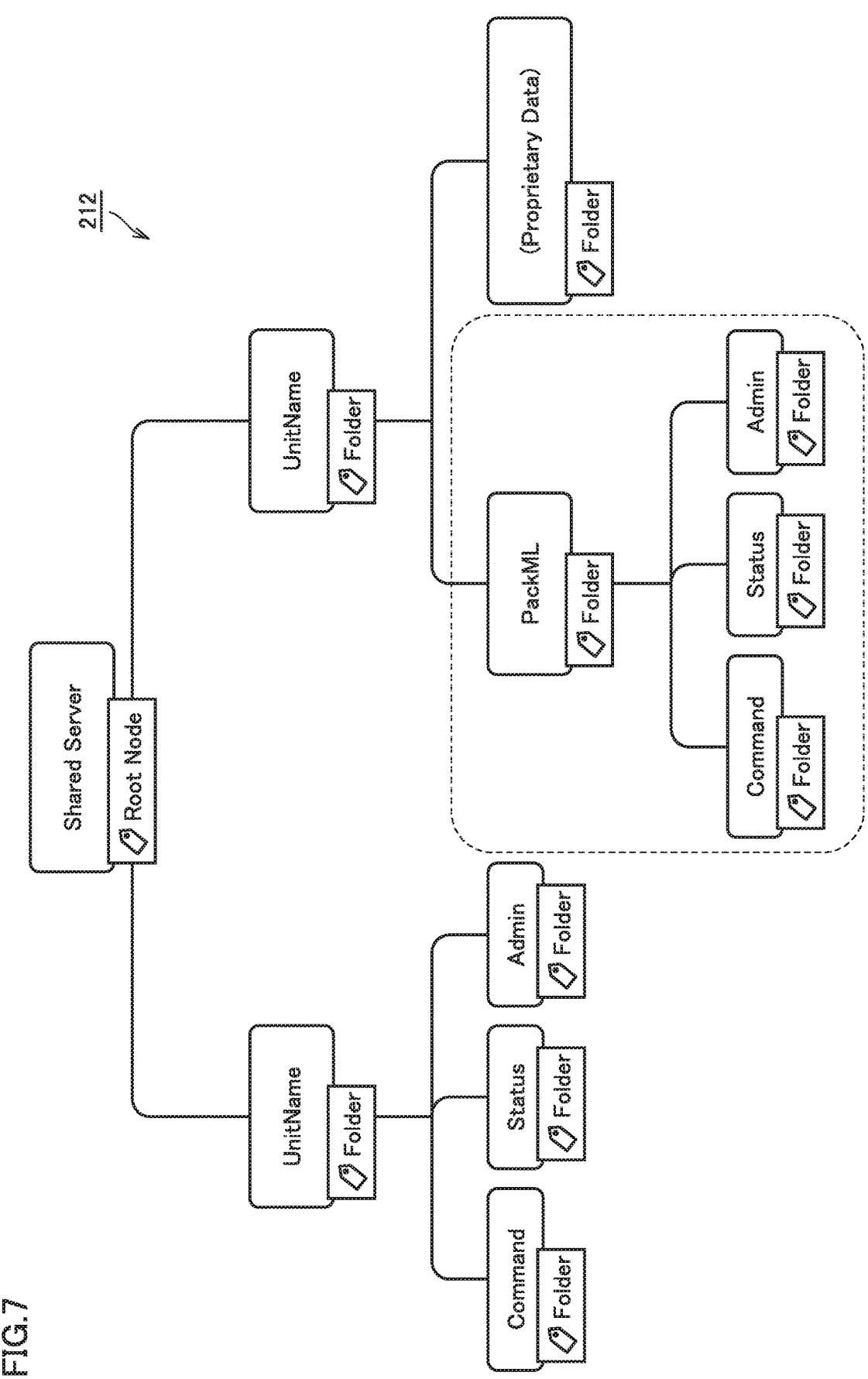
FIG. 7 is a view illustrating an example of an information model according to packaging machine language (PackML).

In PackML, the variable name of each variable is defined as an information model according to the address space of the OPC-UA. FIG. 7 is a view illustrating an example of the information model conforming to PackML. FIG. 7 illustrates information model 212 as an example of the information model conforming to PackML.

As in address space 212A of FIG. 6, the logical address of each variable is defined on information model 212. In PackML, a tag name for each node is associated with a standard variable for each tag. As illustrated in FIG. 7, "Folder" indicated by a "Command" tag, "Folder" indicated by a "Status" tag, and "Folder" indicated by an "Admin" tag exist in low order of "Folder" indicated by a "PackML" tag.

Various variables read and written by the control program of controller 200 are managed in the "Command" tag. That is, the variable managed by the "Command" tag changes according to the state of controller 200 or drive device 300.

The variable representing the states of controller 200 or drive device 300 is managed in the "Status" tag. That is, the variable managed by the "Command" tag changes in response to feedback of the variable managed by the "Command" tag.

Data collected by a high-order system of controller 200 is managed in the "Admin" tag. The data includes analysis of a production capacity of FA system 1, operation information about FA system 1, and the like.

Figure 8:
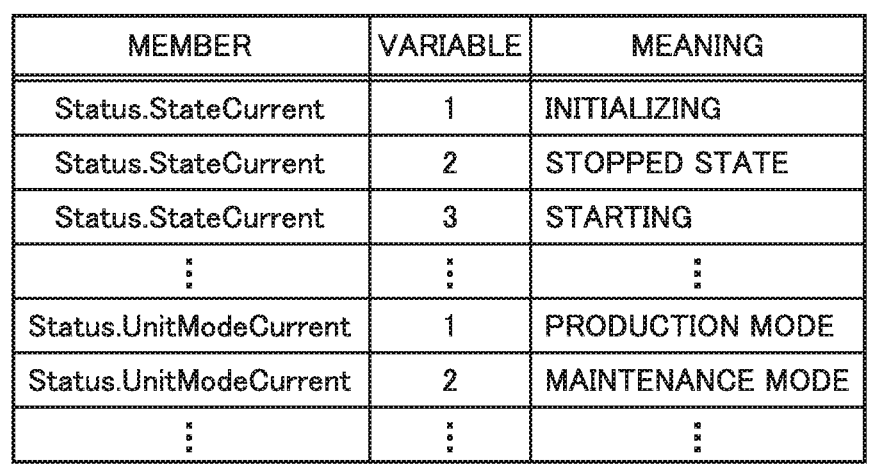
FIG. 8 is a view illustrating an example of a state variable managed by a "Status" tag.

FIG. 8 is a view illustrating an example of a state variable managed by the "Status" tag. FIG. 8 illustrates a state variable 149A indicated by the "Status" tag. State variable 149A is defined by a "status" structure. State variable 149A includes "StatusCurrent" and "UnitModeCurrent" as a member.

"StatusCurrent" is a variable representing the state of controller 200 or drive device 300. As an example, that "StatusCurrent" is "1" indicates "initializing". That "StatusCurrent" is "2" indicates a "stopped state". That "StatusCurrent" is "3" indicates "starting".

"UnitModeCurrent" is a variable representing an operation mode of controller 200 or drive device 300. As an example, that "UnitModeCurrent" is "1" represents a "production mode". That "UnitModeCurrent" is "2" represents a "maintenance mode".

Various variables except for the state variable are managed in information model 212. As an example, information model 212 includes a plurality of process variables. In the process variable, only the data type is determined, and the definition of the process variable itself is determined by the vendor or the designer.

FIG. 9 is a view illustrating one data structure of the process variable. FIG. 9 illustrates a process variable 149B of a structure. Process variable 149B includes "ID", "Name", "Unit", and "Value" as a member.

<D. Display Rule 412>

Figure 12:
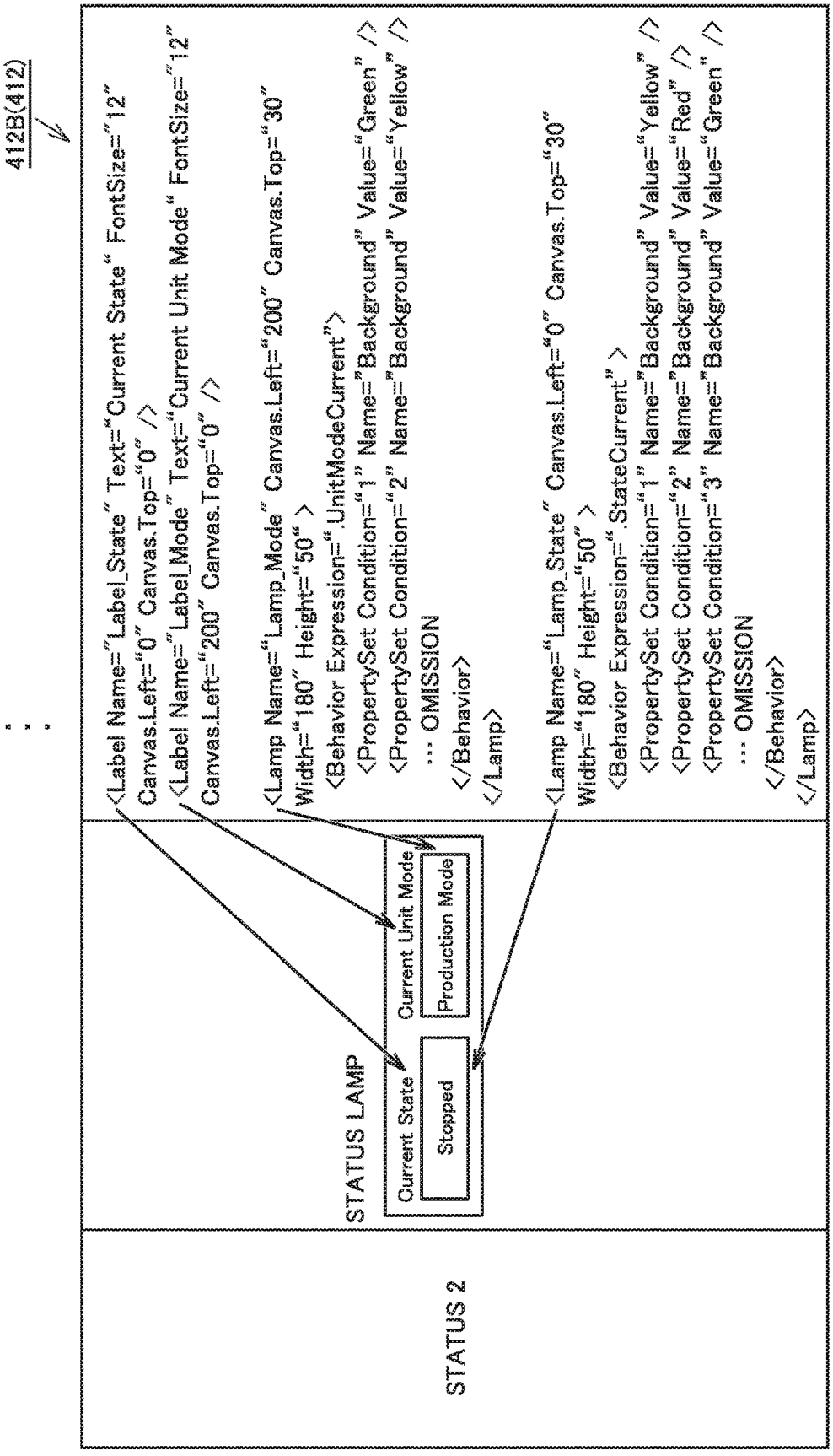
FIG. 12 is a view illustrating a continuation of the template information in FIG. 11.

As described above, in display rule 412, the kind of the display object is associated with the display definition with respect to each variable of the display target in the variables defined by information model 212. The display object associated with each variable and the display definition associated with each variable may be defined separately or integrally. With reference to FIGS. 10 to 12, display rule 412 in the case where the display object associated with each variable and the display definition associated with each variable are separately defined will be described below.

Hereinafter, a correspondence between each variable of the display target and the kind of the display object is referred to as "object information". The correspondence between each variable of the display target and the display definition is referred to as "template information".

(D1. Object Information)

FIG. 10 is a view illustrating an example of the object information. FIG. 10 illustrates object information 412A as an example of the object information. Object information 412A is information included in display rule 412.

As illustrated in FIG. 10, the correspondence between the display object name, the kind of the display object, the variable name in information model 212, and a setting value of the variable is defined in object information 412A.

As an example, the display object is associated with process variable 149B (see FIG. 9). As described above, the definition itself of process variable 149B is defined by the vendor or the designer. That is, it is necessary to associate the display objects with the members "ID", "Name", "Unit", and "Value" of process variable 149B. As an example, a pressure gage is associated with "1" to "999" of "ID" as the display object, and a thermometer is associated with a display object with "1000" to "1999" of "ID" as the display object.

In the example of FIG. 10, display object "tachometer" of the pressure gage is associated with a process variable "MachineA_Prssure1". More specifically, an ID "100" is associated with the member "ID" of the process variable. A name "device A pressure valve 1" is associated with the member "Name" of the process variable. A unit "K" is associated with the member "Unit" of the process variable. Consequently, the display object "tachometer" is associated with the process variable "MachineA_Prssure1" indicated by the ID "100".

The display object "tachometer" changes the display state according to the value of the member "Value" of the process variable. Typically, display device 100 successively updates a meter of the display object "tachometer" in conjunction with the value of the member "Value" of the process variable. In the example of FIG. 10, since the value of the member "Value" of the process variable is "0", the display state is updated such that the meter of "tachometer" indicates "0".

The display object "thermometer" of the thermometer is associated with a process variable "MachineA_Thermo1". More specifically, an ID "1500" is associated with the member "ID" of the process variable. A name "apparatus A temperature 1" is associated with the member "Name" of the process variable. A unit "° C." is associated with the member "Unit" of the process variable. Consequently, the display object "tachometer" is associated with the process variable "MachineA_Prssure1" indicated by the ID "1500".

The display object "thermometer" changes the display state according to the value of the member "Value" of the process variable. Typically, display device 100 successively updates a meter of the display object "thermometer" in conjunction with the value of the member "Value" of the process variable. In the example of FIG. 10, since the value of the member "Value" of the process variable is "0", the display state is updated such that the meter of "thermometer" indicates "0".

In addition to the process variables, the display object is associated with state variables 149A (see FIG. 8). In the example of FIG. 10, a display object "state transition diagram" is associated with the state variable "Status". The display object "state transition diagram" is a display object that visually represents a transition relationship between the states of FA system 1.

As described with reference to FIG. 8, the state variable "Status" includes "StatusCurrent" representing the current state and "UnitModeCurrent" representing the current operating state as a member. The display object "state transition diagram" changes the display state according to the value of the member "StatusCurrent" and the value of the member "UnitModeCurrent" of the state variable. In the example of FIG. 10, since the value of the member "StatusCurrent" is "2", the "stopped state" (see FIG. 8) corresponding to the value is emphasized in the "state transition diagram". Further, since the value of the member "UnitModeCurrent" is "1", "production mode" (see FIG. 8) corresponding to the value is emphasized in the "state transition diagram".

A display object "status lamp" may be associated with the state variable "Status" instead of the display object "state transition diagram". The display object "status lamp" is a display object that indicates a specific state and a specific operating mode in two kinds of display states (for example, turn-on and turn-off). The display object "status lamp" changes the display state according to the value of the member "StatusCurrent" and the value of the member "UnitModeCurrent" of the state variable.

In the example of FIG. 10, since the value of the member "StatusCurrent" is "2", the "stopped state" (see FIG. 8) corresponding to the value of "2" is turned on in the "status lamp". Since the value of the member "UnitModeCurrent" is "1", the "production mode" (see FIG. 8) corresponding to the value of "1" is turned on in the "status lamp".

(D2. Template Information)

With reference to FIGS. 11 and 12, template information defining the correspondence between each variable of the display target and the display definition will be described below. FIG. 11 is a view illustrating an example of the template information. FIG. 12 is a view illustrating a continuation of the template information in FIG. 11. In FIGS. 11 and 12, template information 412B is illustrated as an example of the template information.

Template information 412B is information included in display rule 412. A correspondence among the display object name, the kind of the display object, and the display definition is defined in object information 412A.

The display definition includes at least one of a display position (coordinate value) of the display object and a size of the display object. Preferably the display definition further includes character information describing the display object. For example, the display definition is defined by extensible markup language (XML).

In the example of FIG. 11, the display object "tachometer" of the pressure gage is defined so as to be displayed by a size of a horizontal width of "80" and a vertical width of "100" based on a coordinate (0, 0) on display device screen 130 (see FIG. 1). Template information 412B is defined such that the content of the member "ID" of the process variable is displayed as character information describing the display object while arranged in a text "ID:". This character information is defined so as to be displayed with a font size of "12" based on the coordinate (140, 20) on display device screen 130. Template information 412B is defined such that the content of the member "Name" of the process variable is displayed as character information describing the display object while arranged in a text "Name:". This character information is defined so as to be displayed with the font size of "12" based on the coordinate (140, 60) on display device screen 130.

As illustrated in FIGS. 11 and 12, the display definition is similarly associated with respect to the display object "thermometer" of the thermometer, the display object "state transition diagram" of the status, and the display object "status lamp" of the status.

<E. Display Device Screen 130>

Figure 13:
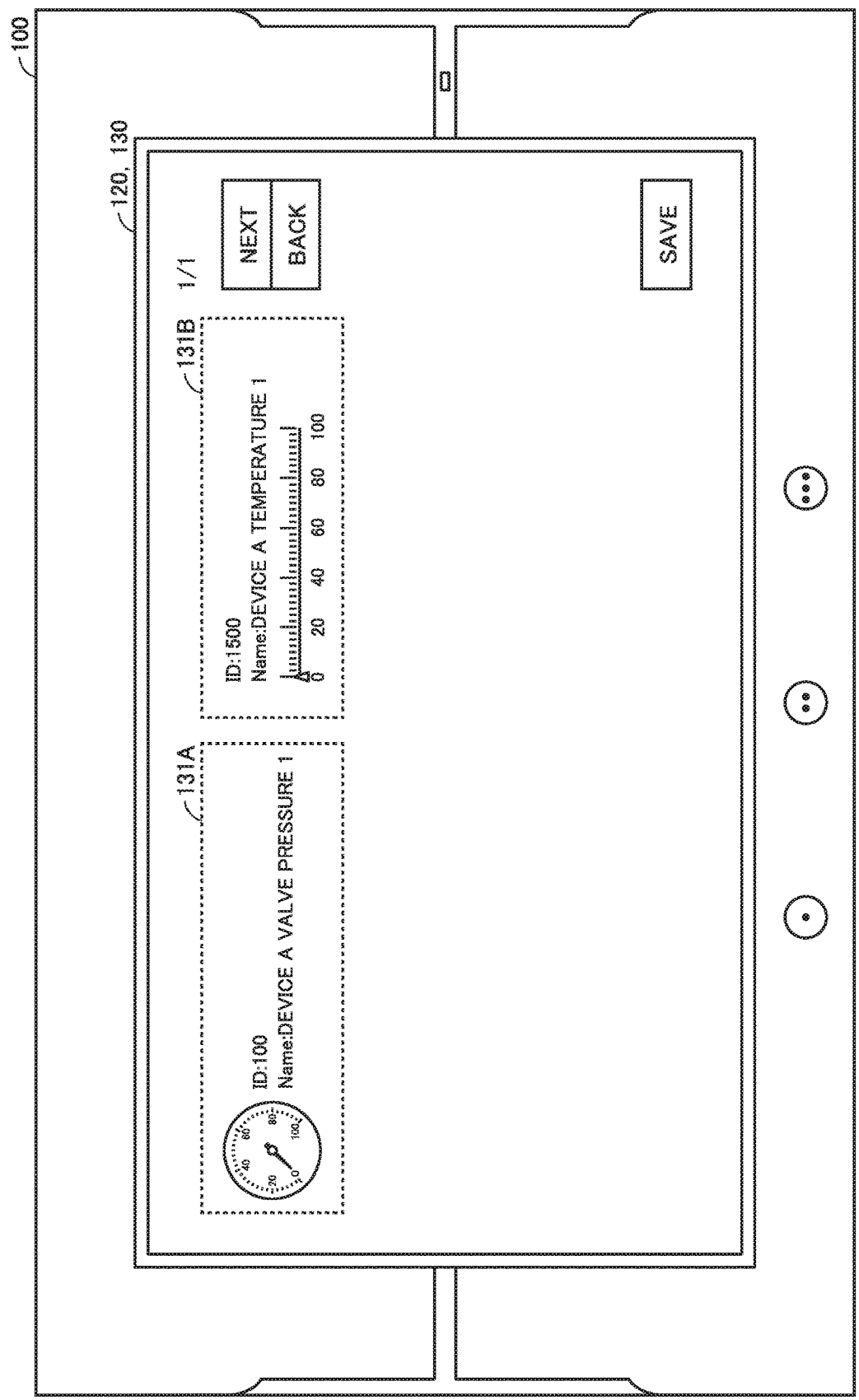
FIG. 13 is a view illustrating an example of a generated display device screen.

With reference to FIGS. 10, 11, 13, and 14, processing of generating the display device screen will be described. FIG. 13 is a view illustrating an example of the generated display device screen. In FIG. 13, display device screen 130 is illustrated as an example of the generated display device screen.

Display device 100 specifies the display object associated with each variable selected on variable selection screen 135 (see FIG. 3) from the display objects included in object information 412A (see FIG. 10) of display rule 412. For example, it is assumed that a process variable "device A valve pressure 1" and a process variable "device A temperature 1" are selected on variable selection screen 135. In this case, display device 100 refers to object information 412A of display rule 412, and acquires the display object "tachometer" associated with the process variable "device A valve pressure 1" and the display object "thermometer" associated with the process variable "device A temperature 1".

Subsequently, display device 100 specifies the display definition associated with the selected display object from the display definitions included in template information 412B (see FIG. 11) of display rule 412. More specifically, display device 100 refers to template information 412B of display rule 412, and acquires the display definition associated with the display object "tachometer" and the display definition associated with the display object "thermometer". Subsequently, display device 100 disposes the display object "tachometer" and the display object "thermometer" at display positions on display device screen 130 indicated by the corresponding display definitions. Consequently, display device screen 130 is generated.

Thereafter, display device 100 updates the display state of the corresponding display object on display device screen 130 according to the value of the process variable successively received from controller 200. As an example, when receiving the process variable representing pressure of one of the components in drive device 300 from controller 200, display device 100 updates the display of the display object "tachometer" associated with the process variable. Typically display device 100 updates the meter of the display object "tachometer" in conjunction with the value of the process variable. When receiving the process variable representing temperature of one of the components in drive device 300 from controller 200, display device 100 updates the display of the display object "thermometer" associated with the process variable. Typically display device 100 sequentially updates the meter of the display object "thermometer" in conjunction with the value of the process variable.

As described above, the display state of the display object is updated in conjunction with the size of the variable selected as the display target, so that the user can intuitively grasp the state of drive device 300.

Figure 14:
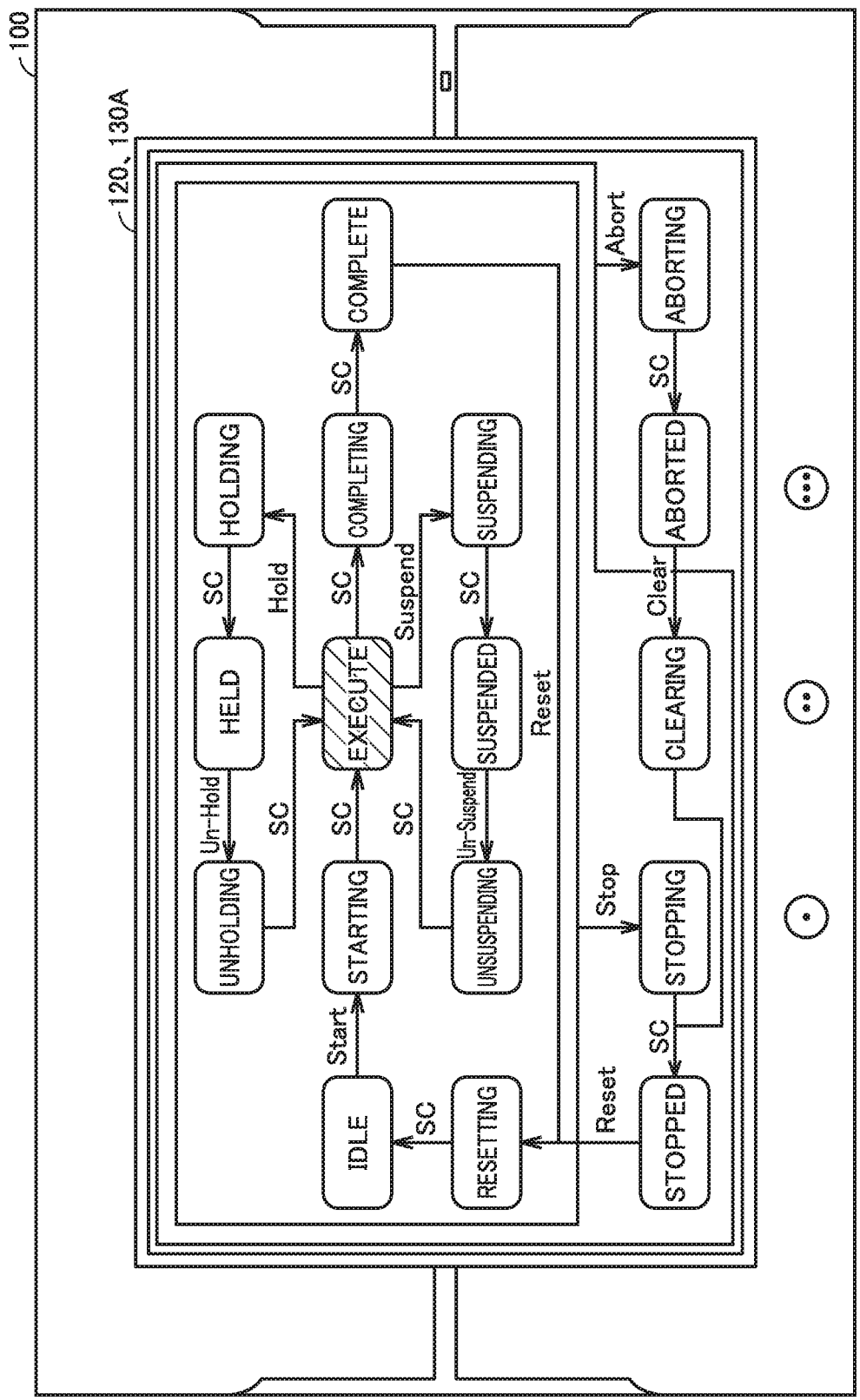
FIG. 14 is a view illustrating another example of the generated display device screen.

FIG. 14 is a view illustrating another example of the generated display device screen. In FIG. 14, a display device screen 130A is illustrated as another example of the generated display device screen.

In the example of FIG. 14, it is assumed that the state variable "Status" is selected on variable selection screen 135 (see FIG. 3). Based on the selection of the state variable "Status", display device 100 acquires the display object associated with the state variable "Status" by referring to object information 412A (see FIG. 10) of display rule 412. As a result, the display object "state transition diagram" is acquired.

Subsequently, display device 100 specifies the display definition associated with the selected display object "state transition diagram" from the display definitions included in template information 412B (see FIG. 11) of display rule 412. Thereafter, display device 100 disposes the display object "state transition diagram" on display device screen 130A according to the acquired display definition. Consequently, display device screen 130A is generated.

Thereafter, display device 100 updates the display of the display object "state transition diagram" according to the value of the state variable successively received from controller 200. Typically display device 100 specifies the current state by referring to "StatusCurrent" that is the member of the state variable "Status", and displays the state on the state transition diagram corresponding to the current state in a display state different from other states. In the example of FIG. 14, "EXCUTE" of the current state is displayed in the mode different from other states.

Thereafter, display device 100 successively updates the display state of the "state transition diagram" according to the value of "StatusCurrent" that is the member of the state variable "Status". At this point, display device 100 sequentially transitions from the current state to the next state based on the variable (command variable) relating to the state transition, the variable being received from controller 200.

As an example, when receiving a "Hold" command, display device 100 changes the current state from the "EXCUTE" state to a "HOLDING" state. When receiving an "SC" command (execution completion command), display device 100 changes the current state from the "EXCUTE" state to a "COMPLETING" state. When receiving a "Suspend" command, display device 100 changes the current state from the "EXCUTE" state to a "SUSPENDING" state.

<F. Modification of Display Device Screen 130>

Figure 15:
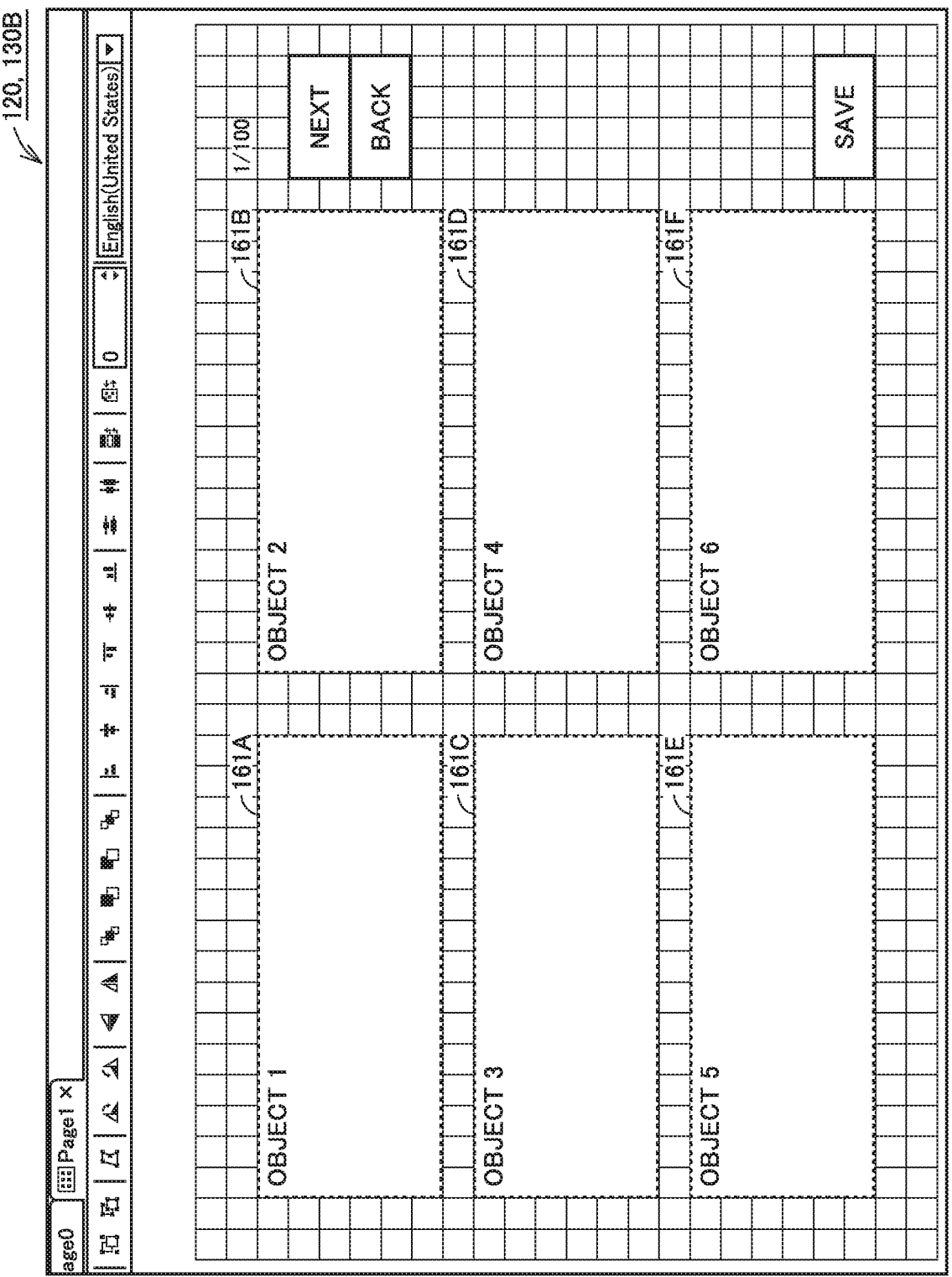
FIG. 15 is a view illustrating a display device screen according to a modification.

With reference to FIG. 15, a modification of the method for generating display device screen 130 will be described. FIG. 15 is a view illustrating a display device screen 130B according to the modification.

The above description has been made on the assumption that the display position of each display object is fixed. However, the display position of each display object does not need to be fixed. For example, display device 100 may display the display objects associated with selected each variable in predetermined order.

In the modification, the display region and the display order of the display objects are previously defined for display device screen 130B. In the example of FIG. 15, display regions 161A to 161F of the display objects are defined for display device screen 130B, and the display objects are sequentially displayed in display regions 161A to 161F.

Any method for determining the display order of the display objects can be adopted. As an example, display device 100 sequentially displays the display objects corresponding to the selected variables in display regions 161A to 161F according to the display order on variable selection screen 135 (see FIG. 3). Alternatively, display device 100 sequentially displays the display objects corresponding to the selected variables in display regions 161A to 161F according to the selection order of the variable on variable selection screen 135.

<G. Hardware Configuration>

Figure 16:
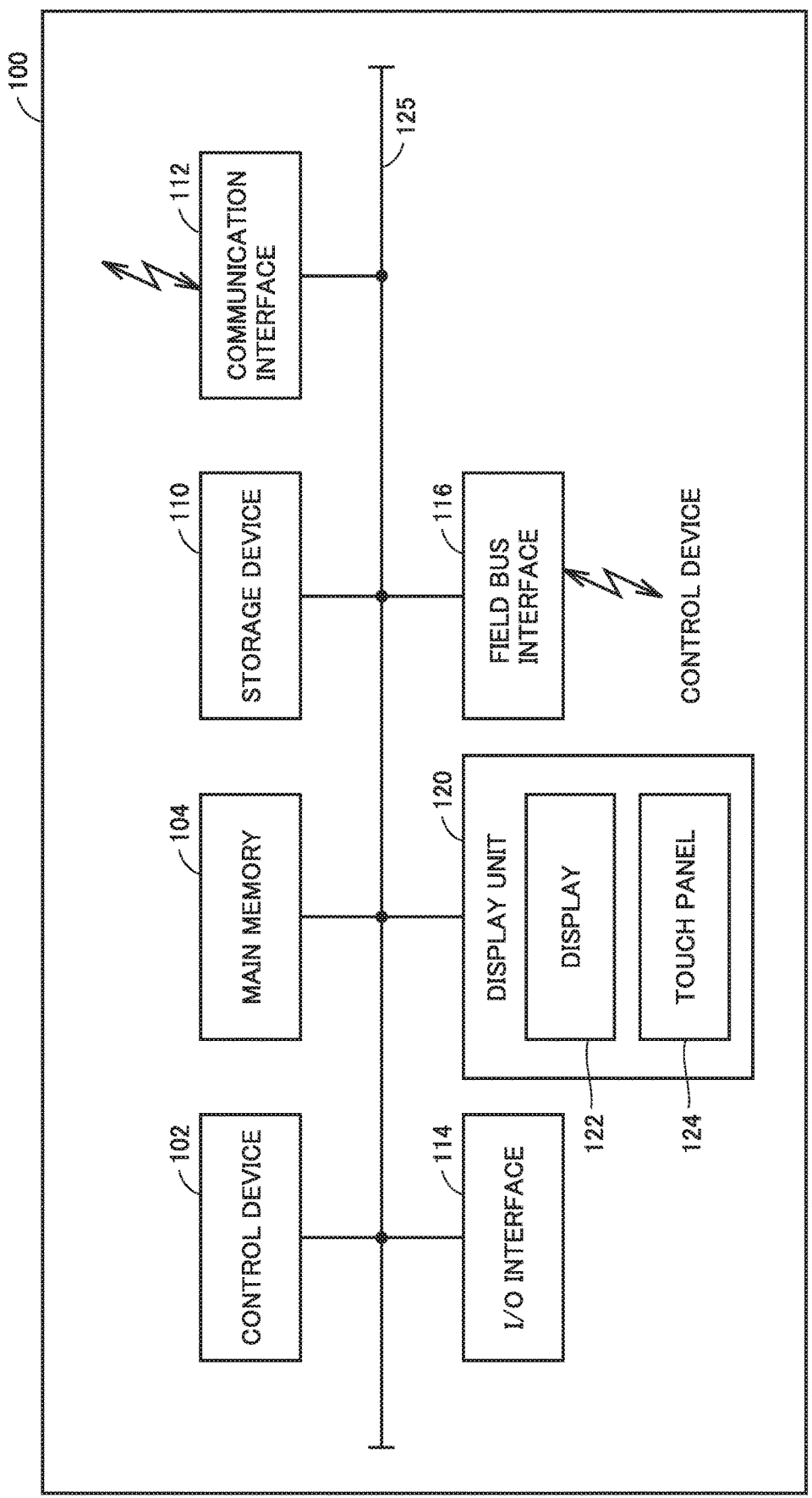
FIG. 16 is a block diagram illustrating a hardware configuration of the display device according to the embodiment.
Figure 17:
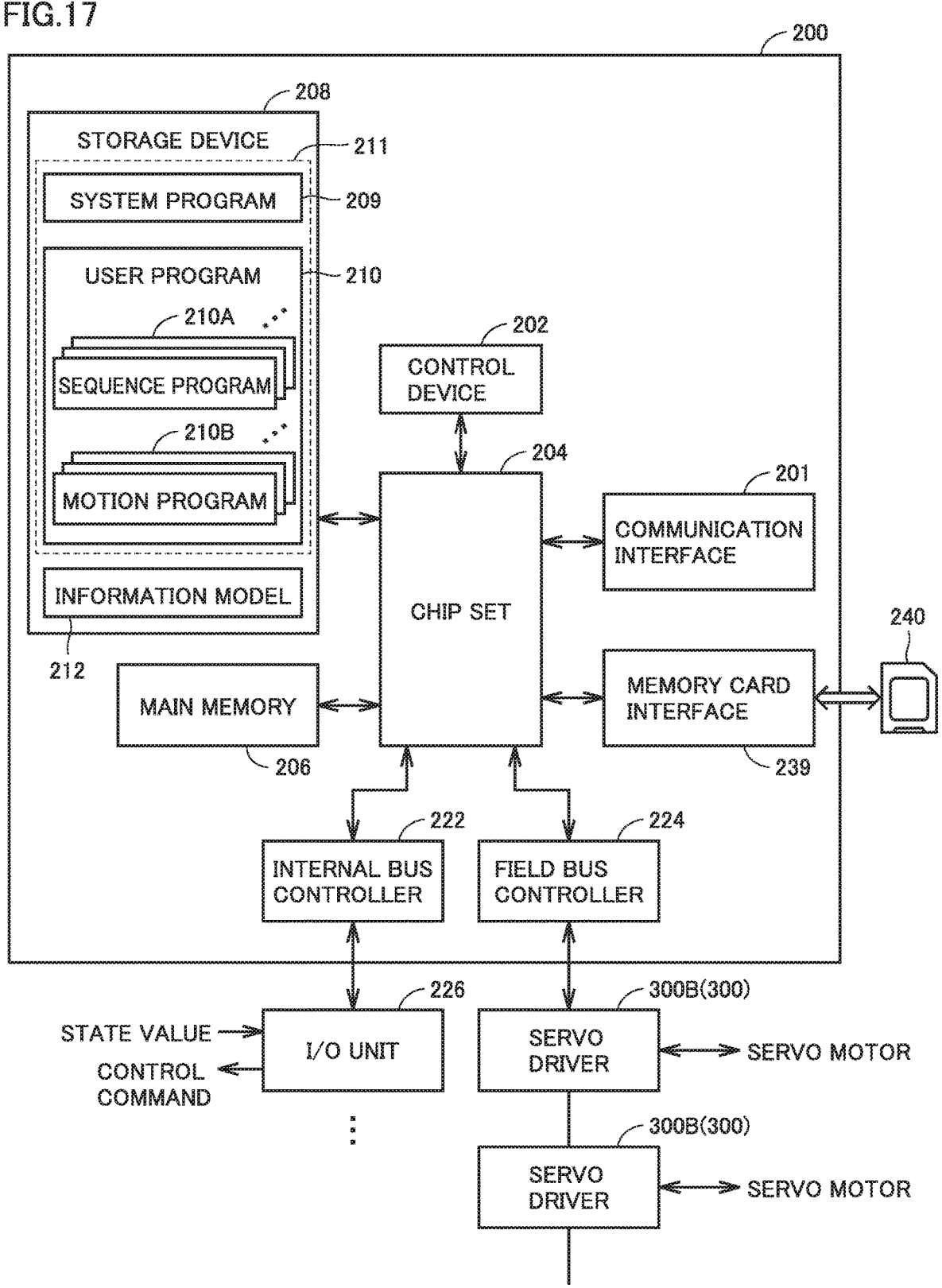
FIG. 17 is a schematic diagram illustrating an example of a hardware configuration of the controller according to the embodiment.
Figure 18:
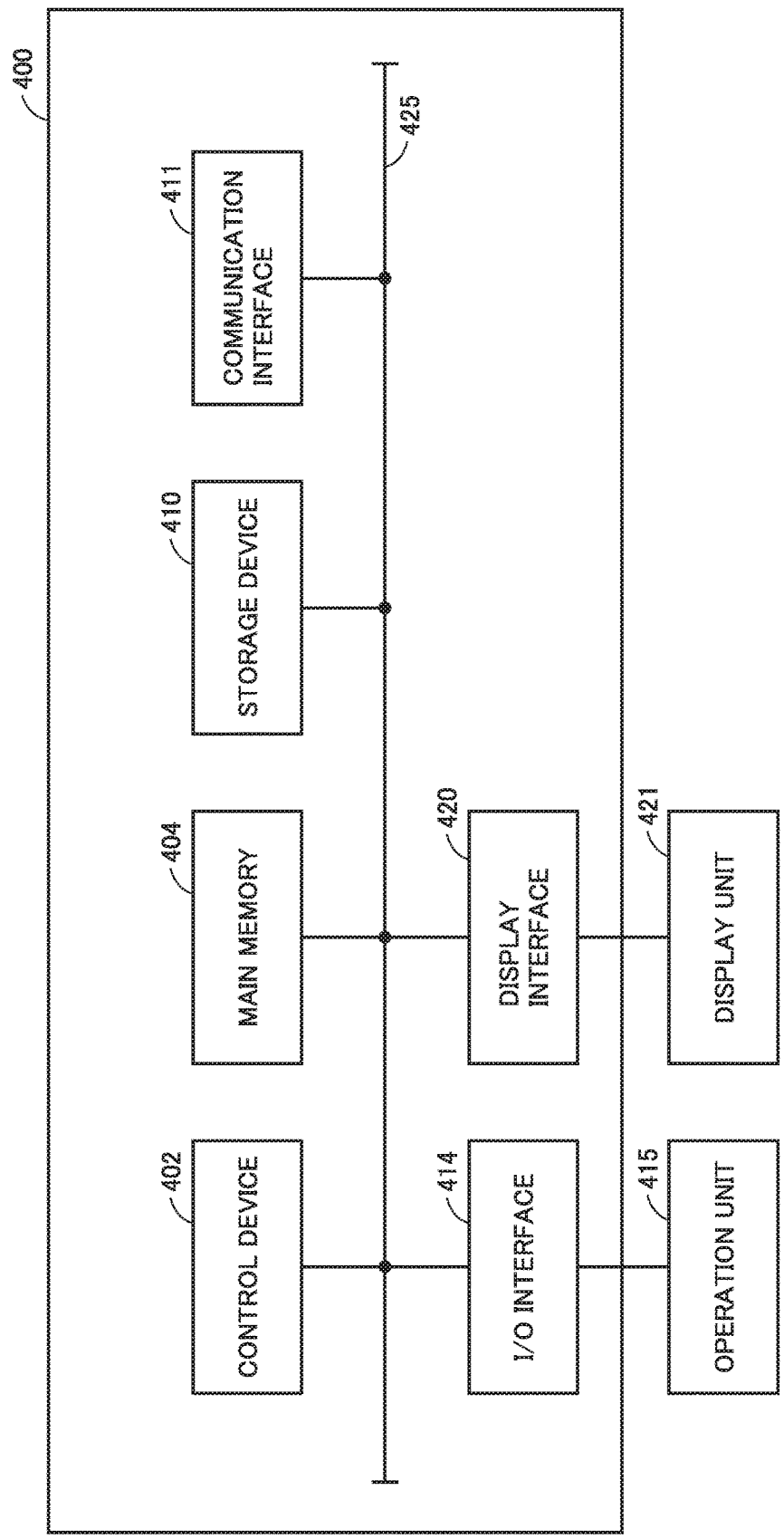
FIG. 18 is a schematic diagram illustrating a hardware configuration of the support device according to the embodiment.

With reference to FIGS. 16 to 18, hardware configurations of display device 100, controller 200, and support device 400 will be described.

(G1. Hardware Configuration of Display Device 100)

With reference to FIG. 16, the hardware configuration of display device 100 will be described. FIG. 16 is a block diagram illustrating the hardware configuration of display device 100.

Display device 100 has the hardware configuration having a general-purpose architecture. That is, display device 100 is mounted as a kind of personal computer. However, display device 100 may be mounted using dedicated hardware instead of general-purpose hardware.

More specifically, display device 100 includes control device 102 such as a central processing unit (CPU) and a micro-processing unit (MPU), a main memory 104, storage device 110 such as a flash memory, and a communication interface 112, an input/output (I/O) interface 114, a field bus interface 116, and display unit 120. These components are communicably connected to one another through an internal bus 125.

Control device 102 reads a control program (not illustrated) stored in storage device 110, expands the control program in main memory 104, and executes the control program, thereby controlling display device 100. That is, control device 102 makes a control unit that performs a control operation by linking with main memory 104 and storage device 110.

Communication interface 112, I/O interface 114, and field bus interface 116 mediate the data exchange between display device 100 and the external device. More specifically, communication interface 112 is an example of communicator 101, and mediates communication with controller 200 or support device 400 through network NW1 (see FIG. 1) and the like. For example, a component capable of performing communication conforming to EtherNET can be used as communication interface 112. I/O interface 114 mediates communication with various user interface devices (such as a keyboard and a mouse). For example, a component capable of performing USB communication or serial communication can be used as I/O interface 114. Field bus interface 116 mediates the data exchange with controller 200. For example, a component capable of performing communication conforming to EtherCAT is used as field bus interface 116.

Display unit 120 presents various pieces of information to the user, and accepts an operation from the user. More specifically, display unit 120 includes a display 122 and a touch panel 124. Display 122 typically includes a liquid crystal display (LCD), an organic electro luminescence (EL) display, or the like. Touch panel 124 is mounted on display 122, and accepts a touch operation by the user. Typically a pressure-sensitive or press-type device is used as display 122.

(G2. Hardware Configuration of Controller 200)

With reference to FIG. 17, the hardware configuration of controller 200 will be described. FIG. 17 is a schematic diagram illustrating an example of the hardware configuration of controller 200.

Controller 200 includes a communication interface 201, a control device 202 such as the CPU and the MPU, a chip set 204, a main memory 206, a storage device 208, an internal bus controller 222, a field bus controller 224, and a memory card interface 239.

Control device 202 reads control program 211 stored in storage device 208, expands control program 211 in main memory 206, and executes control program 211, thereby performing any control on a servo driver 300B that is an example of drive device 300. Control program 211 includes various programs controlling controller 200. As an example, control program 211 includes a system program 209 and a user program 210. System program 209 includes an instruction code providing basic functions, such as data input and output processing and execution timing control, of controller 200. User program 210 is arbitrarily designed according to the control target, and includes a sequence program 210A executing sequence control and a motion program 210B executing motion control. For example, control program 211 is a PLC program described in a ladder language or a structured text (ST) language. The description of control program 211 includes each variable defined in information model 212.

Chip set 204 performs processing of entire controller 200 by controlling each component.

Internal bus controller 222 is an interface that exchanges data with various devices connected to controller 200 through the internal bus. An I/O unit 226 is connected as an example of the device.

Field bus controller 224 is an interface that exchanges data with various drive devices 300 connected to controller 200 through the field bus. Servo driver 300B is connected as an example the device. Additionally, the drive devices such as a robot controller and a visual sensor may be connected.

Internal bus controller 222 and field bus controller 224 can issue any command to the connected device, and acquire any data (including a measured value) managed by the device. Internal bus controller 222 and/or field bus controller 224 also function as an interface that exchanges data with servo driver 300B.

Communication interface 201 controls the data exchange through various wired or wireless networks. Memory card interface 239 is configured so as to detachably attach a memory card 240 (for example, an SD card) that is an example of an external storage medium, writes data in memory card 240, and reads data from memory card 240.

(G3. Hardware Configuration of Support Device 400)

With reference to FIG. 18, the hardware configuration of support device 400 will be described. FIG. 18 is a schematic diagram illustrating the hardware configuration of support device 400.

For example, support device 400 is configured with a computer configured in conformity to a general-purpose computer architecture. Support device 400 includes a control device 402 such as the CPU and the MPU, a main memory 404, a storage device 410 such as the flash memory, a communication interface 411, an I/O interface 414, and a display interface 420. These components are communicably connected to one another through an internal bus 425.

Control device 402 performs various pieces of processing of the embodiment by expanding the program in main memory 404 and executing the program. Main memory 404 is formed of a volatile memory, and functions as a work memory necessary for control device 402 to execute the program. For example, storage device 410 stores various programs controlling support device 400 and display rules 412.

Communication interface 411 exchanges data with the external device through the network. For example, the external devices include display device 100, controller 200, a server, and other communication devices. Support device 400 may be configured to be capable of downloading an information processing program through communication interface 411. The information processing program is a program providing a development tool developing the control program for controller 200. The development tool is configured to be capable of editing display rule 412.

I/O interface 414 is connected to an operation unit 415, and captures a signal indicating a user operation from operation unit 415. Typically operation unit 415 includes a keyboard, a mouse, a touch panel, and a touch pad, and accepts an operation from the user.

Display interface 420 is connected to a display unit 421, and transmits an image signal displaying an image to display unit 421 according to a command from control device 402 or the like. Display unit 421 includes a display and an indicator, and presents various pieces of information to the user.

<H. Control Structure of Display Device 100>

Figure 19:
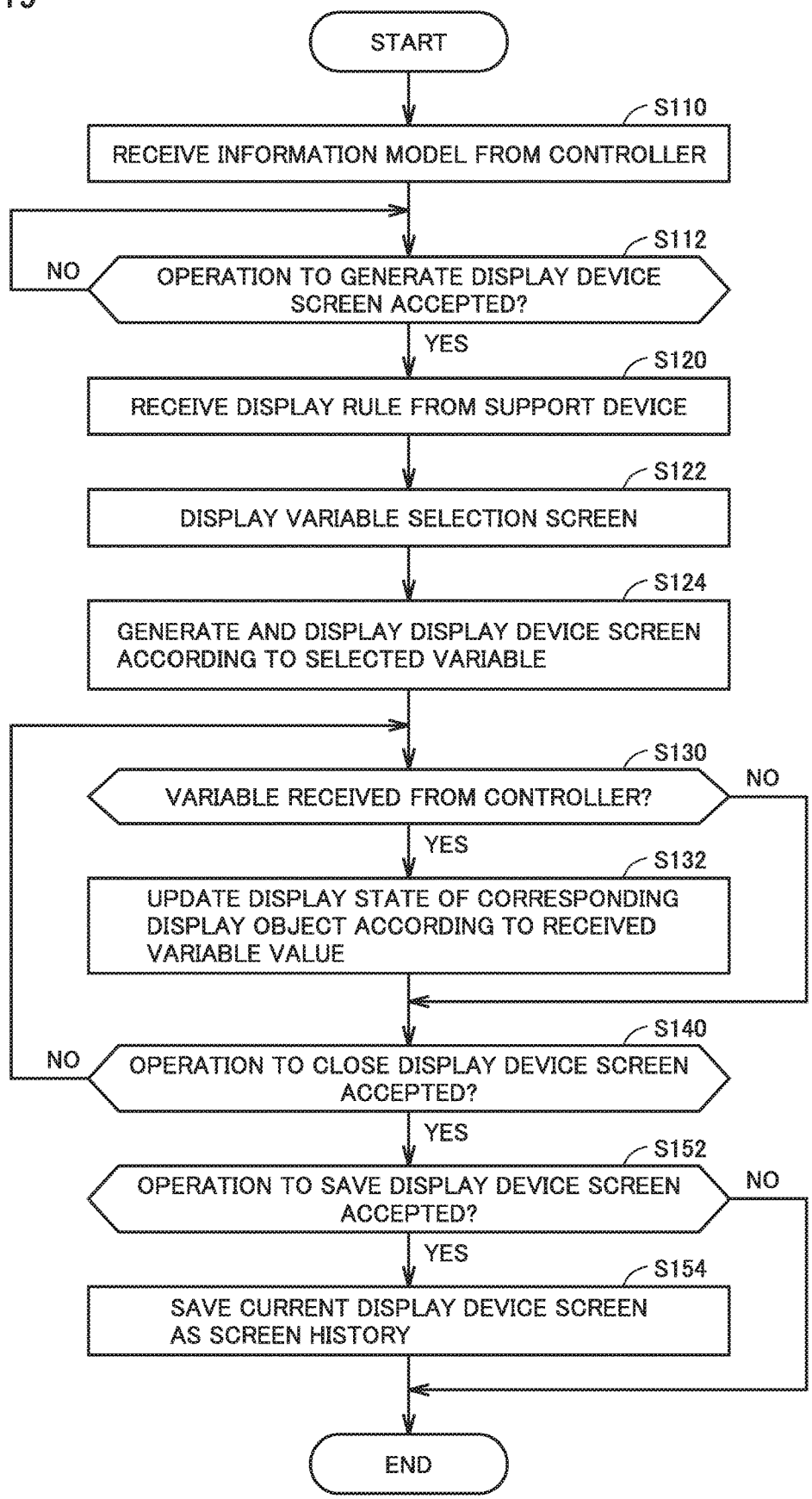
FIG. 19 is a flowchart illustrating a part of processing performed by the display device according to the embodiment.

With reference to FIG. 19, a control structure of display device 100 will be described. FIG. 19 is a flowchart illustrating a part of processing performed by display device 100. Control device 102 of display device 100 executes a program, thereby performing the processing in FIG. 19. In another aspect, a part or all of the processing may be performed by a circuit element or other piece of hardware.

In step S110, control device 102 receives information model 212 (see FIG. 7) defined by standard specification from controller 200.

In step S112, control device 102 determines whether an operation to generate display device screen 130 is accepted. As an example, control device 102 determines that the operation to generate display device screen 130 is accepted based on the fact that the screen generation program previously installed in display device screen 130 is started. In step S112, when control device 102 determines that the operation to generate display device screen 130 is accepted (YES in step S112), control device 102 switches the control to step S120. Otherwise (NO in step S112), control device 102 performs the processing in step S112 again.

In step S120, control device 102 receives display rule 412 (see FIGS. 10 and 11) from support device 400.

In step S122, control device 102 displays a list of variables defined in information model 212 received in step S110 on selection screen 135 (see FIG. 3). The user selects any variable from the variables displayed on selection screen 135.

In step S124, control device 102 generates display device screen 130 according to the variable selected on selection screen 135. More specifically, control device 102 refers to display rule 412 received in step S120, and acquires the display object associated with each variable of the selection target and the display definition. Control device 102 disposes the acquired display object on display device screen 130 according to the corresponding display definition. Thereafter, control device 102 displays generated display device screen 130 on display unit 120.

In step S130, control device 102 determines whether the variable selected as a monitoring target is received from controller 200. When determining that the variable selected as the monitoring target is received from controller 200 (YES in step S130), control device 102 switches the control to step S132. Otherwise (NO in step S130), control device 102 switches the control to step S140.

In step S132, control device 102 updates the display state of the display object on display device screen 130, the display object being attached to the variable, according to the value of the variable received in step S130. That is, control device 102 changes the display state of the corresponding display object in conjunction with the value of the variable received in step S130. This enables the user to intuitively grasp the state of controller 200 or drive device 300.

In step S140, control device 102 determines whether an operation to close display device screen 130 is accepted. When determining that the operation to close display device screen 130 is accepted (YES in step S140), control device 102 switches the control to step S152. Otherwise (NO in step S140), control device 102 returns the control to step S130.

In step S152, control device 102 determines whether an operation to save current display device screen 130 is accepted. When determining that the operation to save current display device screen 130 is accepted (YES in step S152), control device 102 switches the control to step S154. Otherwise (NO in step S152), control device 102 ends the processing in FIG. 19.

In step S154, control device 102 saves current display device screen 130 as the screen history. The screen history includes information (such as the selected variable and the display rule associated with each variable) used to generate display device screen 130, the creation date of display device screen 130, the creator of display device screen 130, the screen name attached to display device screen 130, a memorandum left about display device screen 130, and the like.

<I. Functional Configuration of Display Device 100>

Figure 20:
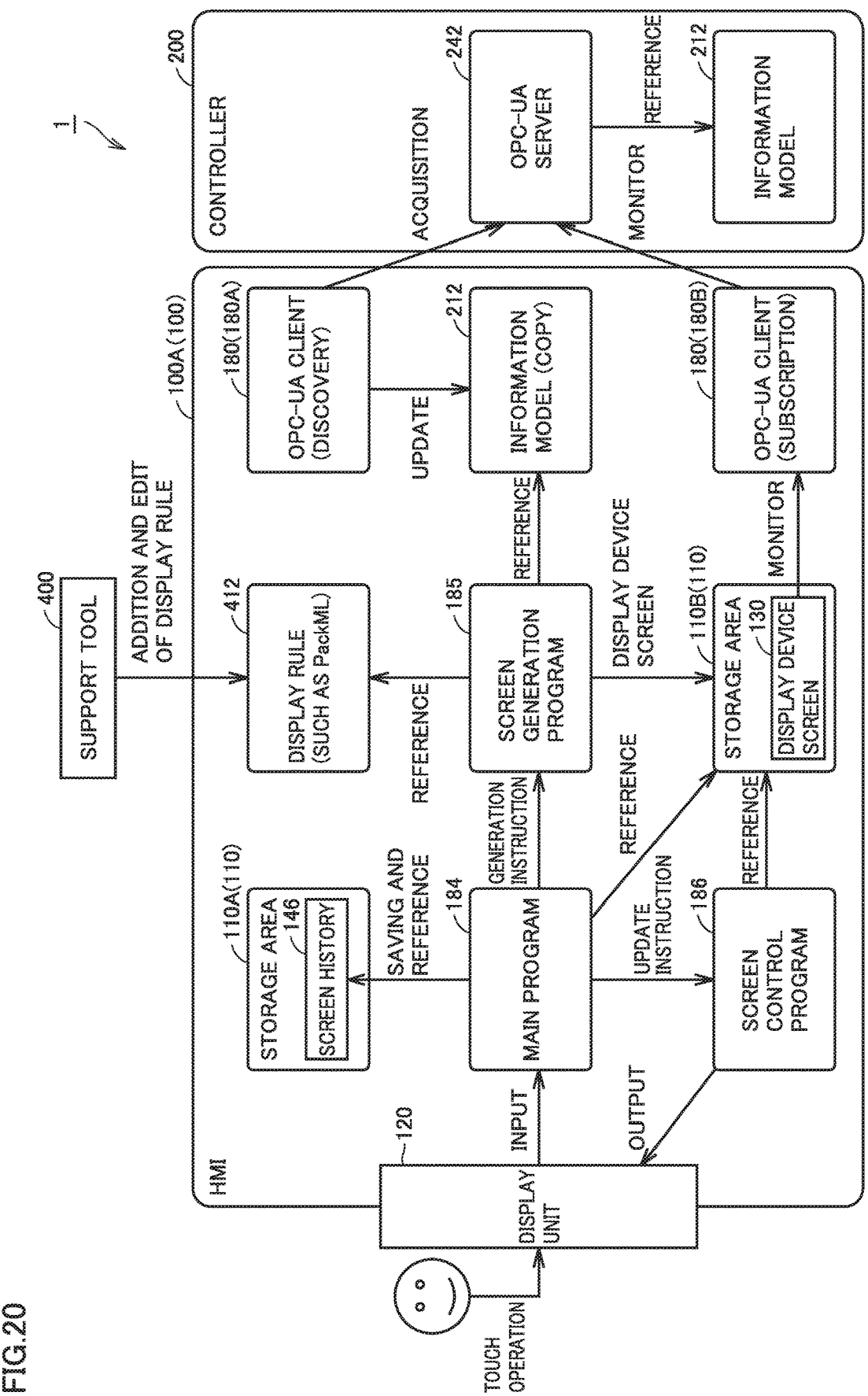
FIG. 20 is a diagram illustrating an example of a functional configuration of the display device according to the embodiment.

With reference to FIG. 20, a function of display device 100 will be described. FIG. 20 is a view illustrating an example of a functional configuration of display device 100.

FIG. 20 illustrates an HMI 100A that is an example of display device 100. HMI 100A includes an OPC-UA client 180, a main program 184, a screen generation program 185, and a screen control program 186 as an application. HMI 100A also includes display device screen 130 stored in a storage area 110B of storage device 110, a screen history 146 stored in a storage area 110A of storage device 110, information model 212, and display rule 412 as data.

HMI 100A communicates with controller 200 in conformity to the OPC-UA communication standard. In order to perform communication conforming to the OPC-UA, it is necessary to cause display device 100 to function as a client, and to cause controller 200 to function as a server. More specifically, an OPC-UA server 242 having a server function is installed in controller 200. As used herein, the "OPC-UA server" means an application (program) functioning as a communication driver.

OPC-UA client 180 having a communication function with OPC-UA server 150 is also installed in HMI 100A. As used herein, the "OPC-UA client" means an application transmitting a communication request (access request) to OPC-UA server 150.

OPC-UA client 180 has a discovery function 180A and a subscription function 180B. Discovery function 180A transmits a request to acquire information model 212 to OPC-UA server 242 of controller 200. Discovery function 180A receives information model 212 from controller 200, and generates a copy of information model 212. Subscription function 180B transmits an instruction to acquire the variable to OPC-UA server 150 every time the assigned communication cycle elapses, and periodically receives the variable from OPC-UA server 150. The values of the received variables are successively reflected on display device screen 130.

Main program 184 and screen generation program 185 generate display device screen 130 in cooperation with each other. More specifically, main program 184 executes the display function of the user interface that accepts the input operation of the user. The screen provided by the user interface includes variable selection screen 135 (see FIG. 3), selection screen 140 saving display device screen 130 (see FIG. 4), and selection screen 145 of the screen history (see FIG. 5).

Variable selection screen 135 is displayed on display unit 120 based on the fact that the user performs the operation to generate display device screen 130 on display unit 120. When the operation to select the variable is performed on selection screen 135, main program 184 outputs a request to generate display device screen 130 to screen generation program 185.

Selection screen 140 selecting save and non-save of display device screen 130 is displayed on display unit 120 based on the fact that the user performs the operation to close display device screen 130 on display unit 120. When the save operation is performed on selection screen 140, main program 184 saves current display device screen 130 as screen history 146.

Selection screen 145 of the screen history is displayed on display unit 120 based on the fact that the user performs an operation to call display device screen 130 generated in the past on display unit 120. When the screen history selection operation is performed on selection screen 145, main program 184 expands information displaying selected display device screen 130 in storage area 110B of storage device 110.

Screen generation program 185 generates display device screen 130 based on the acceptance of the instruction to generate display device screen 130 from main program 184. More specifically, screen generation program 185 refers to display rule 412 received from support device 400, and acquires the display object associated with each variable selected as the display target and the display definition of the display object. Subsequently, screen generation program 185 disposes the acquired display objects on display device screen 130 according to the corresponding display definition. The content defined in display rule 412 can be added or edited in support device 400.

Screen control program 186 refers to display device screen 130 stored in storage area 110B of storage device 110, and displays display device screen 130 on display unit 120. This display processing is performed each time an update instruction is accepted from main program 184.

<J. First Modification>

In the above description, the description has been given on the assumption that the function of generating display device screen 130 is mounted on display device 100.

However, the function of generating display device screen 130 may be mounted on support device 400.

Figure 21:
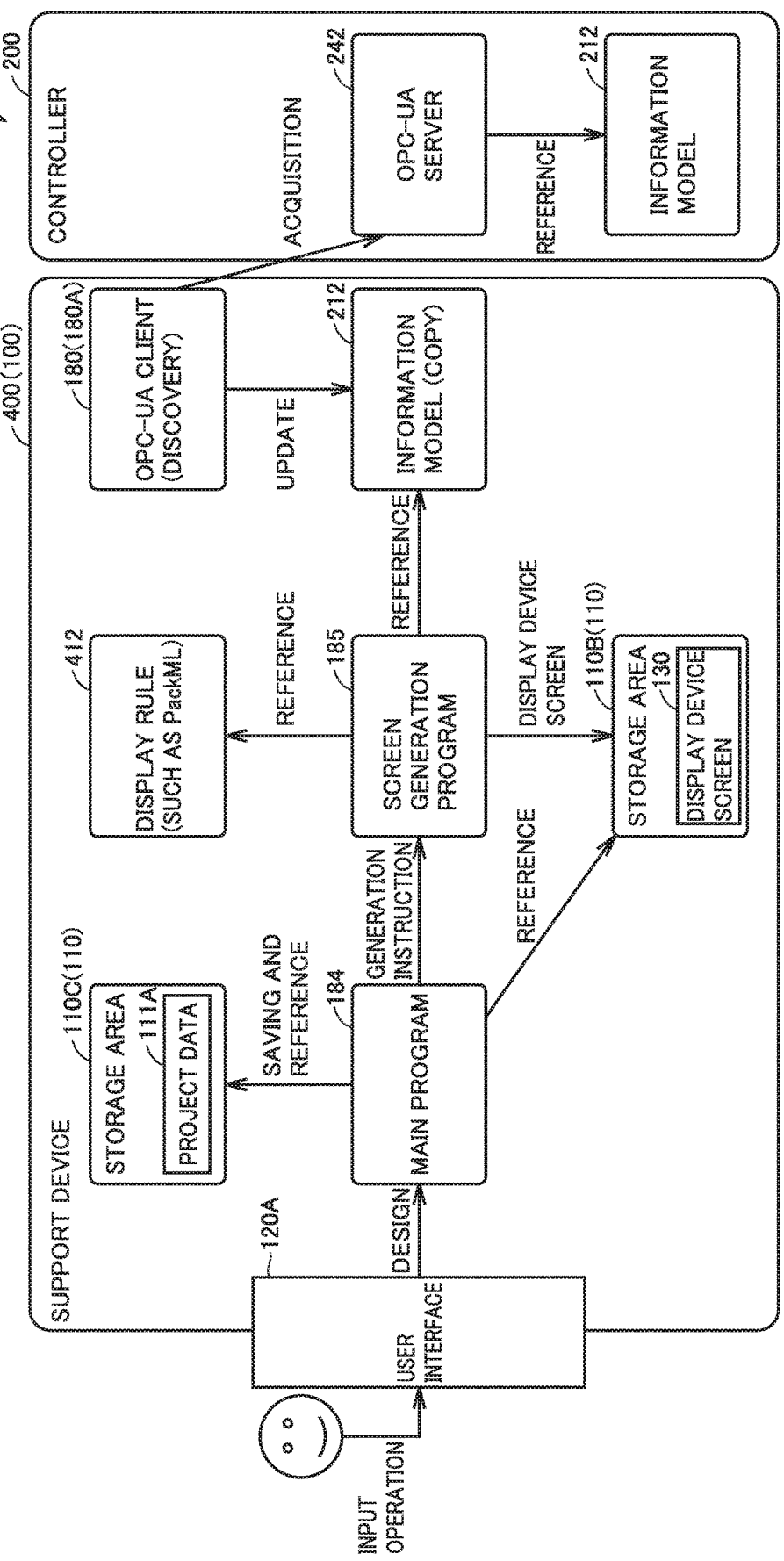
FIG. 21 is a diagram illustrating an example of a functional configuration of a support device according to a modification.

With reference to FIG. 21, an example in which the function of generating display device screen 130 is mounted on support device 400 will be described below. FIG. 21 is a view illustrating an example of the functional configuration of support device 400.

FIG. 21 illustrates support device 400 that is an example of display device 100. Support device 400 includes OPC-UA client 180, main program 184, and screen generation program 185 as an application. Support device 400 includes display device screen 130 stored in storage area 110B of storage device 110, project data 111A stored in a storage area 110C of storage device 110, information model 212, and display rule 412 as data.

Controller 200 includes OPC-UA server 242 as an application. Controller 200 includes information model 212 as data.

OPC-UA client 180 has discovery function 180A. Discovery function 180A transmits a request to acquire information model 212 to OPC-UA server 242 of controller 200. Discovery function 180A receives information model 212 from controller 200, and generates a copy of information model 212.

Main program 184 and screen generation program 185 generate display device screen 130 in cooperation with each other. More specifically, main program 184 executes a display function of a user interface 120A that accepts the input operation of the user. User interface 120A includes a design screen of a control program for controller 200, an edit screen of display rule 412, or various design screens relating to screen generation program 185. The design content of user interface 120A is stored as project data 111A.

Screen generation program 185 generates display device screen 130 based on the acceptance of the instruction to generate display device screen 130 from main program 184. More specifically, screen generation program 185 refers to display rule 412, and acquires the display object associated with each variable selected as the display target and the display definition of the display object. Subsequently, screen generation program 185 disposes the acquired display objects on display device screen 130 according to the corresponding display definition.

<K. Second Modification>

The example in which information model 212 is acquired by communication between the OPC-UA server and the OPC-UA client has been described in the first modification. However, information model 212 may be acquired by another method. That is, the OPC-UA server and the OPC-UA client do not necessarily need to be used to implement the function of generating display device screen 130.

Figure 22:
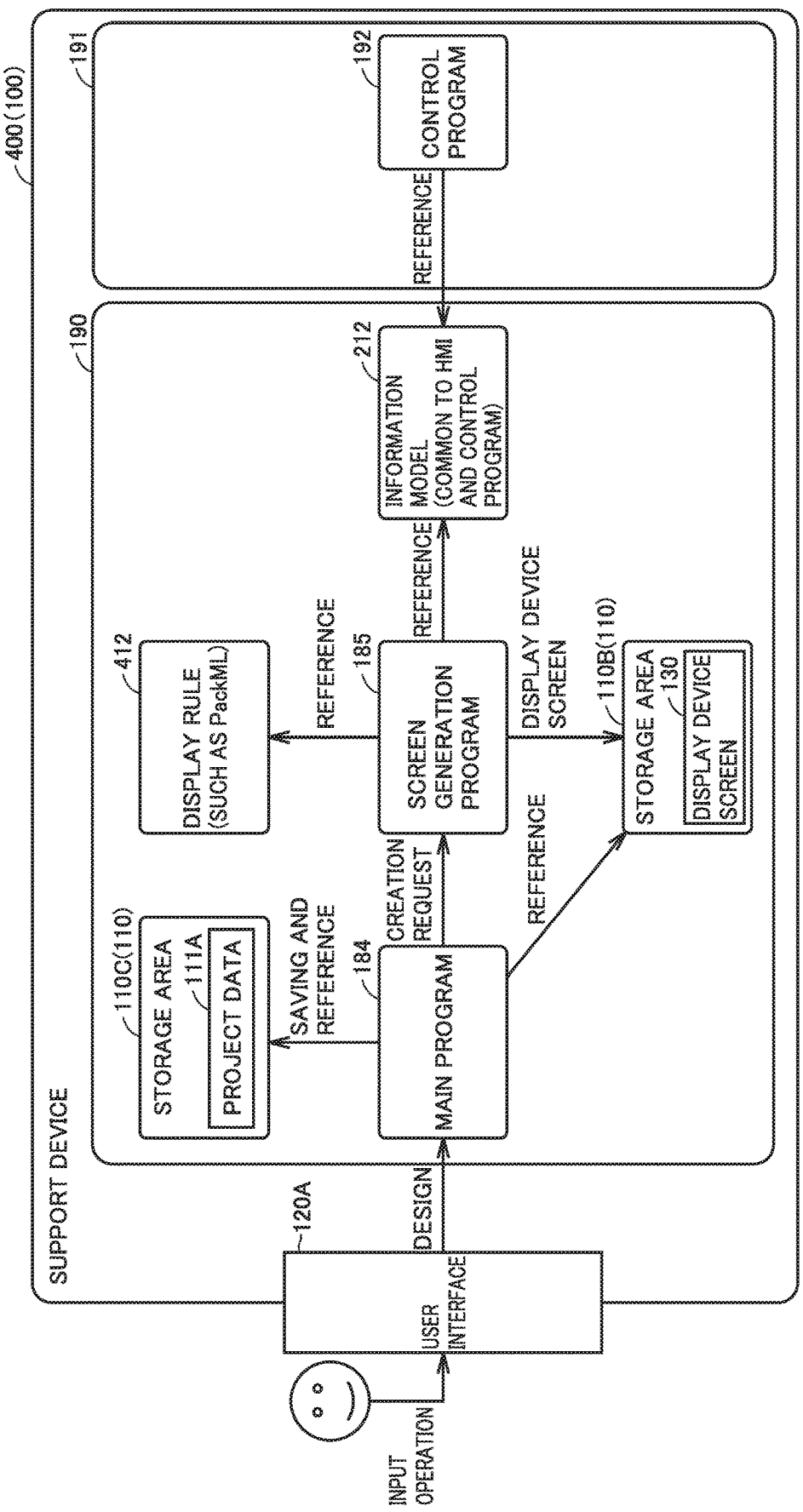
FIG. 22 is a view illustrating a functional configuration of the support device according to a modification.

With reference to FIG. 22, a function, in which the OPC-UA server and the OPC-UA client are not used, of generating display device screen 130, will be described below. FIG. 22 is a view illustrating a modification of the functional configuration of support device 400.

FIG. 22 illustrates support device 400 that is an example of display device 100. Support device 400 includes design data 190 relating to display device screen 130 and design data 191 relating to control program 192 of controller 200. Design data 190 includes display device screen 130 stored in storage area 110B of storage device 110, project data 111A stored in storage area 110C of storage device 110, main program 184, screen generation program 185, information model 212, and display rule 412. Design data 191 includes control program 192 for controller 200.

In the second modification, information model 212 shared by the HMI, controller 200, and support device 400 is previously stored. The method for acquiring information model 212 is arbitrary. For example, information model 212 stored in the external storage device may be written in support device 400, or downloaded from a server or the like.

Screen generation program 185 generates display device screen 130 based on the acceptance of the instruction to generate display device screen 130 from main program 184. More specifically, screen generation program 185 refers to display rule 412, and acquires the display object associated with each variable selected as the display target and the display definition of the display object. Subsequently, screen generation program 185 disposes the acquired display objects on display device screen 130 according to the corresponding display definition.

<L. Summary>

As described above, display device 100 generates display device screen 130 based on information model 212 conforming to the predetermined standard and display rule 412. More specifically, information model 212 includes the plurality of variables representing the state of drive device 300. The correspondence among each variable representing the state of drive device 300, the kind of the display object, and the display definition of the display object is defined in display rule 412. Display device 100 acquires the display object and display definition corresponding to each variable of the display target in the variables included in information model 212 from display rule 412, and disposes each of the display objects on display device screen 130 according to the corresponding display definition.

Using information model 212 conforming to the predetermined standard, the designer does not worry about the format (for example, a variable name or a variable type) of the variable exchanged between controller 200 and drive device 300 when designing display device screen 130. As a result, the designer can determine the specification of display device screen 130 only by defining the display object associated with each variable and the display definition of each display object. This eliminates the necessity of designing display device screen 130. This also eliminates the necessity of previously preparing (downloading) a program generating the screen on display device 100, and various effects such as cost reduction, improvement of convenience, and improvement of operability are generated. Ultimately, the user can immediately use display device 100 simply by taking purchased display device 100 to the site.

<M. Appendix>

As described above, the embodiment includes the following disclosure.

[Configuration 1]

A display device including:
- a display unit (120) configured to display a screen (130) representing a state of a drive device (300) controlled by a controller (200);
- a communicator (101) configured to receive an information model (212) defining a plurality of variables, each variable representing the state of drive device (300) and being defined in a predetermined standard, from controller (200); and
- a control device (102) configured to generate screen (130),
- in which communicator (101) further receives a display rule (412) relating to screen (130) from controller (200) or an external device (400),
- in display rule (412), a kind of a display object visually representing a value of the variable and a display definition relating to display of the display object are associated with each other with respect to a part or all of the plurality of variables defined in the predetermined standard, and
- control device (102) acquires the display object and display definition corresponding to each variable of a display target in the plurality of variables included in information model (212) from display rule (412), and disposes each of the display objects on screen (130) according to the corresponding display definition.

[Configuration 2]

The display device according to the configuration 1, in which display unit (120) is configured to accept an operation to select the variable of the display target from the plurality of variables included in information model (212).

[Configuration 3]

The display device according to the configuration 1 or 2, in which control device (102) updates display of the corresponding display object according to a value of the variable sequentially received from controller (200).

[Configuration 4]

Display device (100) according to any one of the configurations 1 to 3, further including a storage device configured to store generated screen (130) as a screen history, in which based on selection of one screen history from the screen histories stored in the storage device, control device (102) displays the screen indicated by the one screen history on display unit (120) again.

[Configuration 5]

The display device according to any one of the configurations 1 to 4, in which the display definition includes at least one of a display position of the display object displayed on screen (130) and a display size of the display object.

[Configuration 6]

The display device according to any one of the configurations 1 to 5, in which the predetermined standard includes object linking and embedding for process control unified architecture (OPC-UA).

[Configuration 7]

A screen generation method relating to a screen (130) representing a state of a drive device (300) controlled by a controller (200), the screen generation method including:
- step (S12) of receiving an information model (212) defining a plurality of variables, each variable representing the state of drive device (300) and being defined in a predetermined standard, from controller (200);
- step (S22) of receiving a display rule (412) relating to screen (130) from controller (200) or an external device (400);
- step (S32) of acquiring a display object and display definition corresponding to each variable of a display target in the plurality of variables included in information model (212) from display rule (412) to dispose each of the display objects on screen (130) according to the corresponding display definition,
- in which in display rule (412), a kind of the display object visually representing a value of the variable and the display definition relating to display of the display object are associated with each other with respect to a part or all of the plurality of variables defined in the predetermined standard.

[Configuration 8]

A screen generation program relating to a screen (130) representing a state of a drive device (300) controlled by a controller (200), the screen generation program causing a computer to perform:
- step (S12) of receiving an information model (212) defining a plurality of variables, each variable representing the state of drive device (300) and being defined in a predetermined standard, from controller (200);
- step (S22) of receiving a display rule (412) relating to screen (130) from controller (200) or an external device (400);
- step (S32) of acquiring a display object and display definition corresponding to each variable of a display target in the plurality of variables included in information model (212) from display rule (412) to dispose each of the display objects on screen (130) according to the corresponding display definition,
- in which in display rule (412), a kind of the display object visually representing a value of the variable and the display definition relating to display of the display object are associated with each other with respect to a part or all of the plurality of variables defined in the predetermined standard.

It should be considered that the disclosed embodiment is an example in all respects and not restrictive. The scope of the present invention is defined by not the description above, but the claims, and it is intended that all modifications within the meaning and scope of the claims are included in the present invention.

REFERENCE SIGNS LIST

100: display device, 101: communicator, 102, 202, 402: control device, 104, 206, 404: main memory, 110, 208, 410: storage device, 110A, 110B, 110C: storage area, 111A: project data, 112, 201, 411: communication interface, 114, 414: interface, 116: field bus interface, 120, 421: display unit, 120A: user interface, 122: display, 124: touch panel, 125, 425: internal bus, 130, 130A, 130B: display device screen, 131A: tachometer, 131B: thermometer, 135, 140, 145: selection screen, 136: variable name display region, 137: selection operation acceptance region, 141, 142: input region, 143: save button, 144: cancel button, 146: screen history, 146A: creation date, 146B: creator, 146C: screen name, 146D: memorandum, 147: display button, 148: line, 149A: state variable, 149B: process variable, 150, 242: OPC-UA server, 161A, 161F: display region, 180: OPC-UA client, 180A: discovery function, 180B: subscription function, 184: main program, 185: screen generation program, 186: screen control program, 190, 191: design data, 192, 211: control program, 200: controller, 204: chip set, 209: system program, 210: user program, 210A: sequence program, 210B: motion program, 212: information model, 212A: address space, 222: internal bus controller, 224: field bus controller, 226: I/O unit, 239: memory card interface, 240: memory card, 300: drive device, 300B: servo driver, 400: support device, 412: display rule, 412A: object information, 412B: template information, 415: operation unit, 420: display interface

The invention claimed is:

1. A display device comprising:
a display unit configured to display a screen representing a state of a drive device controlled by a controller;
a communicator configured to receive an information model defining a plurality of variables, each variable representing the state of the drive device and being defined in accordance with the PackML (Packaging Machine Language) standard, from the controller; and
a control device comprising a processor configured to perform operations comprising generating the screen, wherein
in response to the operation of generating the screen being accepted by a user operation, the communicator further receives a display rule relating to the screen from an external device different from the controller,
in the display rule, a kind of a display object visually representing a value of an associated variable and a display definition relating to display of the display object are associated with each other with respect to a variable of the plurality of variables defined in accordance with the PackML standard,
the processor of the control device is configured with the program to perform operations further comprising acquiring the display object and display definition corresponding to each variable of a display target from the display rule, and disposing each of the display objects on the screen according to the corresponding display definition, the display definition including at least one of a display position of the display object displayed on the screen and a display size of the display object,
the display unit is configured to accept a user operation to select one or more of the variables of the display targets from the plurality of variables included in the information model, and
the processor of the control device is configured with the program to perform operations further comprising generating and displaying a device screen on the display unit for each of the selected one or more variables according to the respective display definition.

2. The display device according to claim 1, wherein the processor of the control device is configured with the program to perform operations further comprising updating display of the corresponding display object according to a value of the variable successively received from the controller.

3. The display device according to claim 1, further comprising a storage device configured to store the generated screen as a screen history,
wherein based on selection of one screen history from the screen histories stored in the storage device, the processor of the control device is configured with the program to perform operations further comprising displaying the screen indicated by the one screen history on the display unit again.

4. The display device according to claim 1, wherein the PackML standard includes object linking and embedding for process control unified architecture (OPC-UA).

5. A screen generation method relating to a screen representing a state of a drive device controlled by a controller, the screen generation method comprising:
receiving an information model defining a plurality of variables, each variable representing the state of the drive device and being defined in accordance with the PackML (Packaging Machine Language) standard, from the controller;
generating the screen;
in response to generating the screen being accepted by a user operation, receiving a display rule relating to the screen from an external device different from the controller; and
acquiring a display object and display definition corresponding to each variable of a display target from the display rule to dispose each of the display objects on the screen according to the corresponding display definition, wherein
in the display rule, a kind of the display object visually representing a value of an associated variable and the display definition relating to display of the display object are associated with each other with respect to a variable of the plurality of variables defined in accordance with the PackML standard, the display definition includes at least one of a display position of the display object displayed on the screen and a display size of the display object,
the method further comprises accepting a user operation to select one or more of the variables of the display targets from the plurality of variables included in the information model, and
generating and displaying a device screen for each of the selected one or more variables according to the respective display definition.

6. The screen generation method according to claim 5, further comprising updating display of the corresponding display object according to a value of the variable successively received from the controller.

7. The screen generation method according to claim 5, further comprising
storing the generated screen as a screen history into a storage device, and
displaying the screen indicated by the one screen history on the display unit again based on selection of one screen history from the screen histories stored in the storage device.

8. The screen generation method according to claim 5, wherein the predetermined standard includes object linking and embedding for process control unified architecture (OPC-UA).

9. A non-transitory computer-readable storage medium storing thereon a screen generation program relating to a screen representing a state of a drive device controlled by a controller, the screen generation program when read and executed, causing a computer to perform operations comprising:
receiving an information model defining a plurality of variables, each variable representing the state of the drive device and being defined in accordance with the PackML (Packaging Machine Language) standard, from the controller;
generating the screen;
in response to generating the screen being accepted by a user operation, receiving a display rule relating to the screen from an external device different from the controller; and
acquiring a display object and display definition corresponding to each variable of a display target from the display rule to dispose each of the display objects on the screen according to the corresponding display definition, wherein
in the display rule, a kind of the display object visually representing a value of an associated variable and the display definition relating to display of the display object are associated with each other with respect to a variable of the plurality of variables defined in accordance with the PackML standard, the display definition includes at least one of a display position of the display object displayed on the screen and a display size of the display object,
the operations further comprise accepting a user operation to select one or more of the variables of the display targets from the plurality of variables included in the information model, and
generating and displaying a device screen for each of the selected one or more variables according to the respective display definition.

10. The non-transitory storage medium according to claim 9, wherein the screen generation program, when read and executed, causes the computer to perform operations further comprising accepting an operation to select the variable of the display target from the plurality of variables included in the information model.

11. The non-transitory storage medium according to claim 9, the screen generation program, when read and executed, causes the computer to perform operations further comprising updating display of the corresponding display object according to a value of the variable successively received from the controller.

12. The non-transitory storage medium according to claim 9, the screen generation program, when read and executed, causes the computer to perform operations further comprising:
storing the generated screen as a screen history into a storage device, and
displaying the screen indicated by the one screen history on the display unit again based on selection of one screen history from the screen histories stored in the storage device.

13. The non-transitory storage medium according to claim 9, wherein the PackML standard includes object linking and embedding for process control unified architecture (OPC-UA).

* * * * *